(12) United States Patent
Mikic et al.

(10) Patent No.: US 11,905,009 B2
(45) Date of Patent: Feb. 20, 2024

(54) ROTARY AIRFOIL WITH REDUCED ACOUSTIC OUTPUT

(71) Applicant: Joby Aero, Inc., Santa Cruz, CA (US)

(72) Inventors: Gregor Veble Mikic, Santa Cruz, CA (US); JoeBen Bevirt, Santa Cruz, CA (US); Jeremy Bain, Santa Cruz, CA (US); Alex Stoll, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

(21) Appl. No.: 17/826,163

(22) Filed: May 27, 2022

(65) Prior Publication Data

US 2022/0297833 A1 Sep. 22, 2022

Related U.S. Application Data

(63) Continuation of application No. 17/083,069, filed on Oct. 28, 2020, now Pat. No. 11,407,510, which is a continuation of application No. 16/708,280, filed on Dec. 9, 2019, now abandoned.

(60) Provisional application No. 62/776,853, filed on Dec. 7, 2018.

(51) Int. Cl.
*B64C 11/18* (2006.01)
*B64C 29/00* (2006.01)
*B64C 11/30* (2006.01)
*B64C 13/16* (2006.01)
*G05D 1/00* (2006.01)

(52) U.S. Cl.
CPC .......... *B64C 29/0033* (2013.01); *B64C 11/18* (2013.01); *B64C 11/303* (2013.01); *B64C 13/16* (2013.01); *G05D 1/102* (2013.01)

(58) Field of Classification Search
CPC .......... B64C 11/06; B64C 11/18; B64C 11/30; B64C 11/306; B64C 11/308; B64C 11/32; B64C 11/34; B64C 27/52; B64C 29/0033
See application file for complete search history.

(56) References Cited

U.S. PATENT DOCUMENTS

| | | | | |
|---|---|---|---|---|
| 3,089,666 A | * | 5/1963 | Quenzler | B64C 29/0033 244/66 |
| 4,416,434 A | * | 11/1983 | Thibert | B64C 27/467 416/223 R |
| 4,652,213 A | * | 3/1987 | Thibert | B64C 11/18 416/223 R |
| 5,174,721 A | * | 12/1992 | Brocklehurst | B64C 27/463 416/223 R |
| 5,381,985 A | * | 1/1995 | Wechsler | B64C 11/48 244/69 |

(Continued)

*Primary Examiner* — Courtney D Heinle
*Assistant Examiner* — Sang K Kim
(74) *Attorney, Agent, or Firm* — Michael A. Guth

(57) ABSTRACT

The rotary airfoil 100 defines a cross section and a span, wherein the cross section is a function of the point along the span (e.g., spanwise point) and defines an upper surface and a lower surface at each spanwise point. The rotary airfoil 100 also defines, at a cross section, a lift coefficient ($C_L$) that is a function of the angle of attack at which the airfoil is rotated through the air. The system can optionally include: a rotor hub to mount the rotary airfoil, a tilt mechanism to pivot the rotary airfoil between a forward configuration and a hover configuration, and a pitching mechanism to change the angle of attack of the rotary airfoil 100.

6 Claims, 14 Drawing Sheets

(56) References Cited

U.S. PATENT DOCUMENTS

| | | | | |
|---|---|---|---|---|
| 6,655,631 B2 * | 12/2003 | Austen-Brown | ...... | B64D 25/00 |
| | | | | 244/12.4 |
| 6,749,401 B2 * | 6/2004 | Vanmoor | ................ | B64C 11/18 |
| | | | | 244/45 R |
| 8,016,566 B2 * | 9/2011 | Agnihotri | ............. | B64C 27/467 |
| | | | | 416/223 R |
| 8,221,086 B2 * | 7/2012 | Watts | ................... | F04D 29/181 |
| | | | | 416/234 |
| 9,851,723 B2 * | 12/2017 | Builta | ..................... | B64C 27/52 |
| 2020/0001995 A1 * | 1/2020 | Yang | ....................... | B64C 27/20 |
| 2020/0148347 A1 * | 5/2020 | Bevirt | .................... | B64C 11/46 |

\* cited by examiner

ROTARY AIRFOIL WITH REDUCED ACOUSTIC OUTPUT

CROSS-REFERENCE TO RELATED APPLICATIONS

This application is a continuation of U.S. application Ser. No. 17/083,069, filed 28 Oct. 2020, which is a continuation of U.S. application Ser. No. 16/708,280, filed 9 Dec. 2019, which claims the benefit of U.S. Provisional Application No. 62/776,853, filed 7 Dec. 2018, each of which is incorporated in its entirety by this reference.

This application is related to U.S. application Ser. No. 16/409,653, filed May 10, 2019, and U.S. application Ser. No. 16/430,163, filed Jun. 3, 2019, each of which is incorporated in its entirety by this reference.

TECHNICAL FIELD

This invention relates generally to the aviation field, and more specifically to a new and useful rotary airfoil and design method therefor in the aviation field.

BACKGROUND

Aircraft that are propelled by rotating external surfaces, such as rotorcraft and propeller-craft, utilize rotating and often unenclosed blades (e.g., rotary airfoils) to produce thrust. However, rotating blades are a significant source of acoustic noise that is undesirable for aircraft use in several contexts, including urban and suburban environments, in which high noise levels can be disruptive. Noise-based flightpath restrictions can significantly reduce the ability to deploy urban and suburban air mobility systems.

Thus, there is a need in the aviation field to create a new and useful rotary airfoil and design method therefor. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Overview

Figure 1:
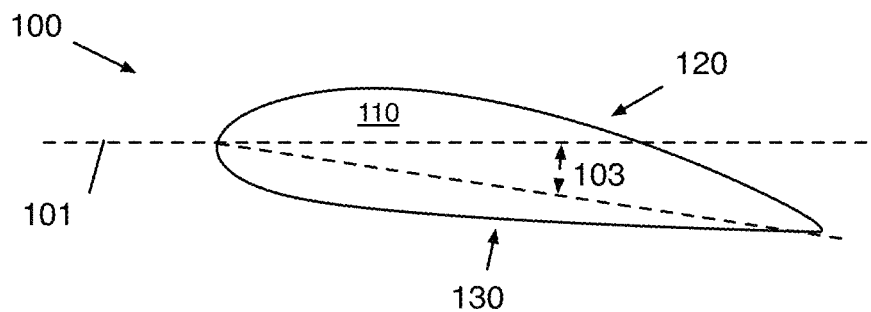
FIG. 1 is a schematic diagram of the rotary airfoil.

As shown in FIG. 1, the rotary airfoil 100 defines a cross section and a span, wherein the cross section is a function of the point along the span (e.g., spanwise point) and defines an upper surface and a lower surface at each spanwise point. The rotary airfoil 100 also defines, at a cross section, a lift coefficient ($C_L$) that is a function of the angle of attack 103 (AoA) at which the airfoil is rotated through the air. However, the rotary airfoil 100 can additionally or alternatively include or define any other suitable components or features.

Figure 20:
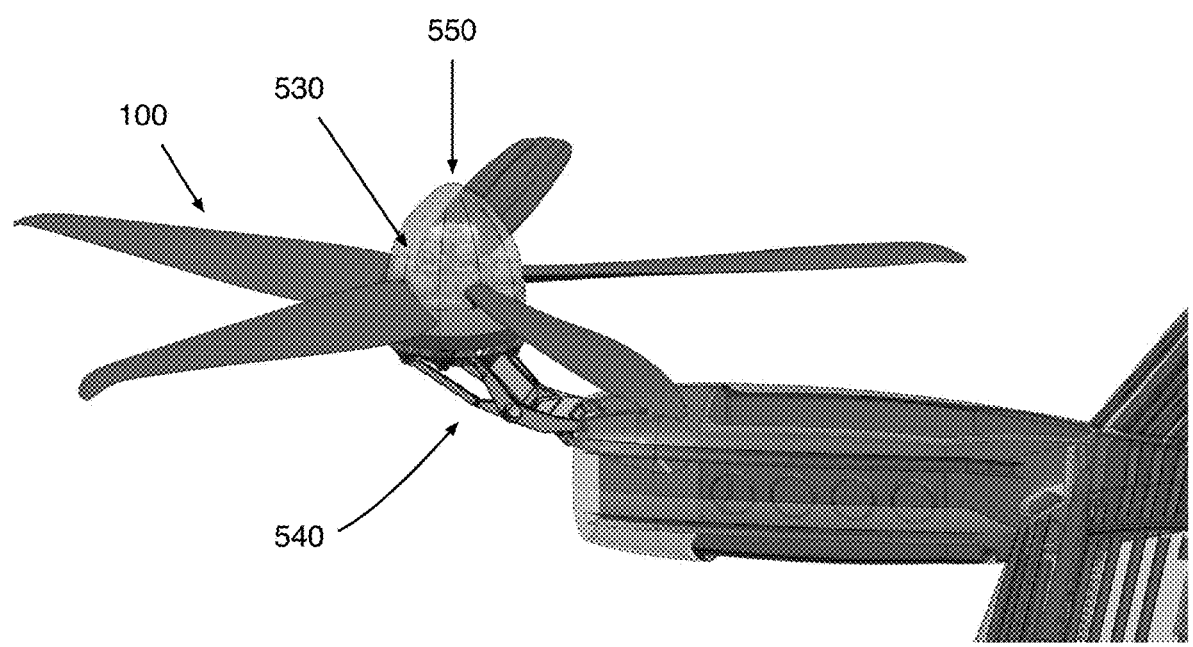
FIG. 20 is an isometric view of an example of the tilt-rotor system with a set of the rotary airfoils.

The system can optionally include: a rotor hub 550 to mount the rotary airfoil, a tilt mechanism to pivot the rotary airfoil between a forward configuration and a hover configuration, and a pitching mechanism to change the angle of attack of the rotary airfoil 100 (an example is shown in FIG. 20). However, the system can additionally or alternatively include or define any other suitable components or features.

The rotary airfoil 100 functions to generate an aerodynamic force as it is rotated through a fluid (e.g., air), which can be used to propel and/or lift a vehicle (e.g., aircraft). The rotary airfoil 100 can also function to define, at a cross section, a lift coefficient at each angle of attack within a range of angles of attack that reduces and/or minimizes loading variations across the rotor disc of a propeller utilizing two or more rotary airfoils 100. The rotary airfoil 100 can also function to define a cross section that includes a feature (e.g., a bump) or geometry that localizes a boundary layer separation point along the chordwise direction at a range of angles of attack, as shown in the examples in FIGS. 7A and 7B. However, the rotary airfoil 100 can additionally or alternatively have any other suitable function.

Figure 2:
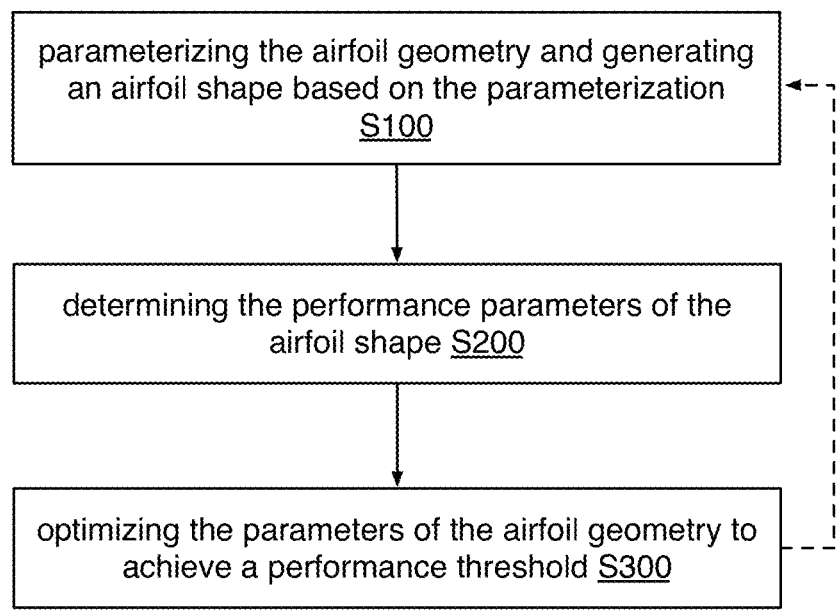
FIG. 2 is a flowchart diagram of the design method for the rotary airfoil.

As shown in FIG. 2, the design method 200 can include: parameterizing the airfoil geometry S100, generating an airfoil shape according to the parameterization S150; determining the performance parameters of the airfoil shape S200; and optimizing the parameters of the airfoil geometry to achieve a performance threshold S300.

The design method 200 functions to compute an airfoil shape (e.g., a cross-sectional shape, a shape of the variation of the cross-section along the span, etc.). The design method 200 can also function to parameterize the airfoil shape in a specified manner that enables iterative computational optimization of the airfoil shape. The design method 200 can also function to enable computational prediction of airfoil performance (e.g., via computational fluid dynamics/CFD). However, the design method 200 can additionally or alternatively have any other suitable function.

Figure 14:
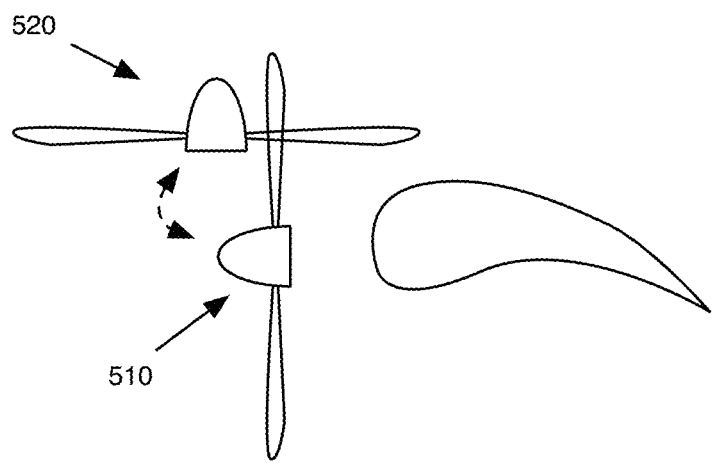
FIG. 14 depicts an example of the forward configuration and the hover configuration of the rotary airfoil.

The rotary airfoil 100 is preferably implemented in conjunction with an aircraft propulsion system (e.g., propeller, rotor, etc.), which in turn is preferably implemented in conjunction with an aircraft. In particular, the aircraft is preferably a rotorcraft, but can additionally or alternatively include any suitable aircraft. The rotorcraft is preferably a tiltrotor aircraft with a plurality of aircraft propulsion systems (e.g., rotor assemblies, rotor systems, etc.), operable between a forward arrangement 510 and a hover arrangement 520 (as shown in the example in FIG. 14). However, the rotorcraft can alternatively be a fixed wing aircraft with one or more rotor assemblies or propulsion systems, a helicopter with one or more rotor assemblies (e.g., wherein at least one rotor assembly or aircraft propulsion system is oriented substantially axially to provide horizontal thrust), a lighter-than-air aircraft, and/or any other suitable rotorcraft or vehicle propelled by rotors. The rotorcraft preferably includes an all-electric powertrain (e.g., battery powered electric motors) to drive the one or more rotor assemblies, but can additionally or alternatively include a hybrid powertrain (e.g., a gas-electric hybrid including an internal-combustion generator), an internal-combustion powertrain (e.g., including a gas-turbine engine, a turboprop engine, etc.), and any other suitable powertrain.

Figure 15A:
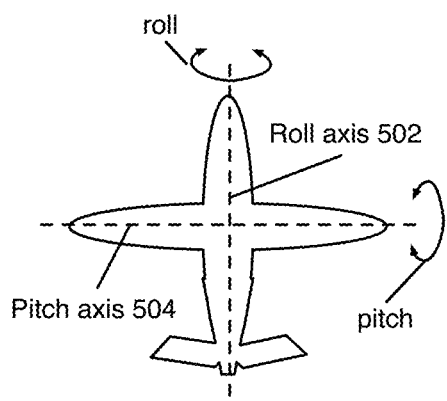
FIG. 15A depicts an example of the pitch axis and the roll axis of the aircraft.
Figure 15B:
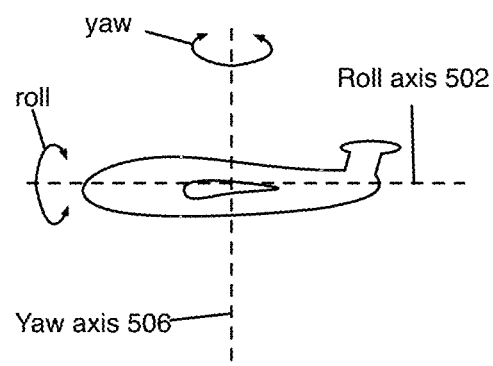
FIG. 15B depicts an example of the roll axis and the yaw axis of the aircraft.

The tiltrotor aircraft defines various geometrical features. The tiltrotor aircraft defines principal geometric axes, as shown in FIGS. 15A-15B, including: a vertical axis (e.g., yaw axis 506), a longitudinal axis (e.g., a roll axis 502), and a lateral axis (e.g., a pitch axis 504). The vertical, longitudinal, and lateral axes can be defined such that they intersect at the center of gravity (CoG) of the aircraft, and a pure moment about any one of the aforementioned axes causes the aircraft 100 to rotate about the vertical, longitudinal, and lateral axes, respectively. However, the three principal axes can additionally or alternatively be defined geometrically (e.g., based on lines of symmetry of the aircraft in one or more dimensions, based on arbitrary lines through the aircraft, etc.) with or without reference to the CoG. For example, the axes can intersect at a geometric center of the aircraft. The propellers of the tiltrotor aircraft each define a disc area centered at the axis of rotation of the propeller, and the disc area is contained by an infinite disc plane extending away from the axis of rotation. In variations of the aircraft, the disc planes of each of the plurality of rotors can be coextensive with any suitable subset of the remainder of the plurality of propulsion assemblies. In a first example, each disc plane can be coextensive with each other disc plane in the hover configuration of a first variation. In a second example, each disc plane can be coextensive with the disc plane of one other propulsion assembly symmetrically across the longitudinal axis of the aircraft and displaced from (e.g., offset from) the disc planes of each other propulsion assembly. However, the disc planes of the plurality of propulsion assemblies can be otherwise suitably arranged relative to one another.

The term "rotor" as utilized herein, in relation to the control system or otherwise, can refer to a rotor, a propeller, and/or any other suitable rotary aerodynamic actuator. While a rotor can refer to a rotary aerodynamic actuator that makes use of an articulated or semi-rigid hub (e.g., wherein the connection of the blades to the hub can be articulated, flexible, rigid, and/or otherwise connected), and a propeller can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of "rotor" can refer to either configuration, and any other suitable configuration of articulated or rigid blades, and/or any other suitable configuration of blade connections to a central member or hub. Likewise, the usage of "propeller" can refer to either configuration, and any other suitable configuration of articulated or rigid blades, and/or any other suitable configuration of blade connections to a central member or hub. Accordingly, the tiltrotor aircraft can be referred to as a tilt-propeller aircraft, a tilt-prop aircraft, and/or otherwise suitably referred to or described.

In a specific example, the rotary airfoil 100 is integrated into an electric tiltrotor aircraft including a plurality of tiltable rotor assemblies (e.g., six tiltable rotor assemblies), wherein each of the tiltable rotor assemblies includes a rotor that includes a plurality of blades configured according to the blade design described herein. The electric tiltrotor aircraft can operate as a fixed wing aircraft, a rotary-wing aircraft, and in any liminal configuration between a fixed and rotary wing state (e.g., wherein one or more of the plurality of tiltable rotor assemblies is oriented in a partially rotated state). The control system of the electric tiltrotor aircraft in this example can function to command and control the plurality of tiltable rotor assemblies within and/or between the fixed wing arrangement and the rotary-wing arrangement.

In a specific example, the rotary airfoil 100 can be integrated into the tilt-rotor aircraft described in U.S. application Ser. No. 16/409,653, filed May 10, 2019, which is incorporated in its entirety by this reference.

2. Benefits

Variations of the technology can afford several benefits and/or advantages over conventional rotary airfoils and/or design methods therefor.

Figure 3:
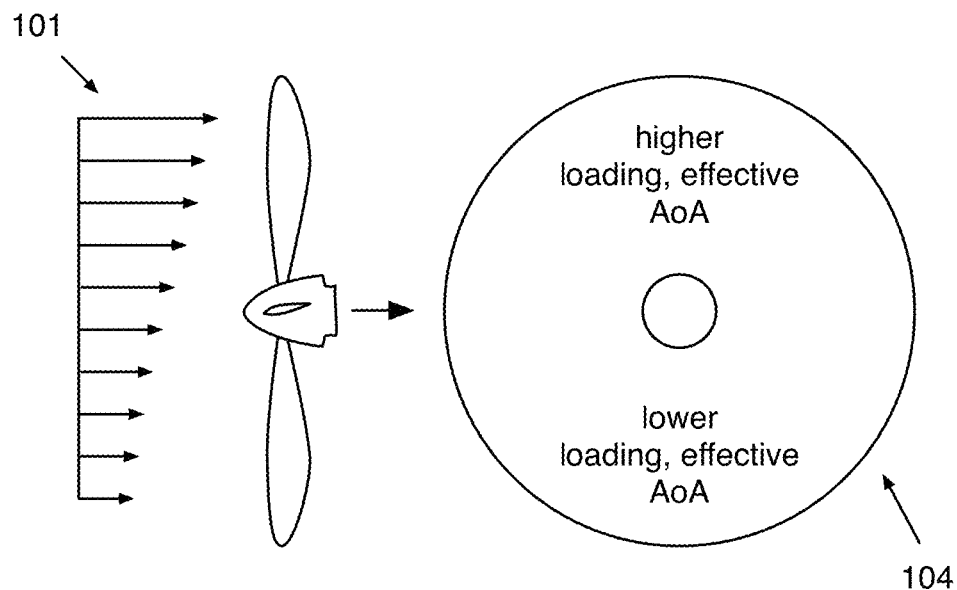
FIG. 3 depicts a schematic diagram of load variation resulting from variable inflow conditions in relation to the rotary airfoil.
Figure 4:
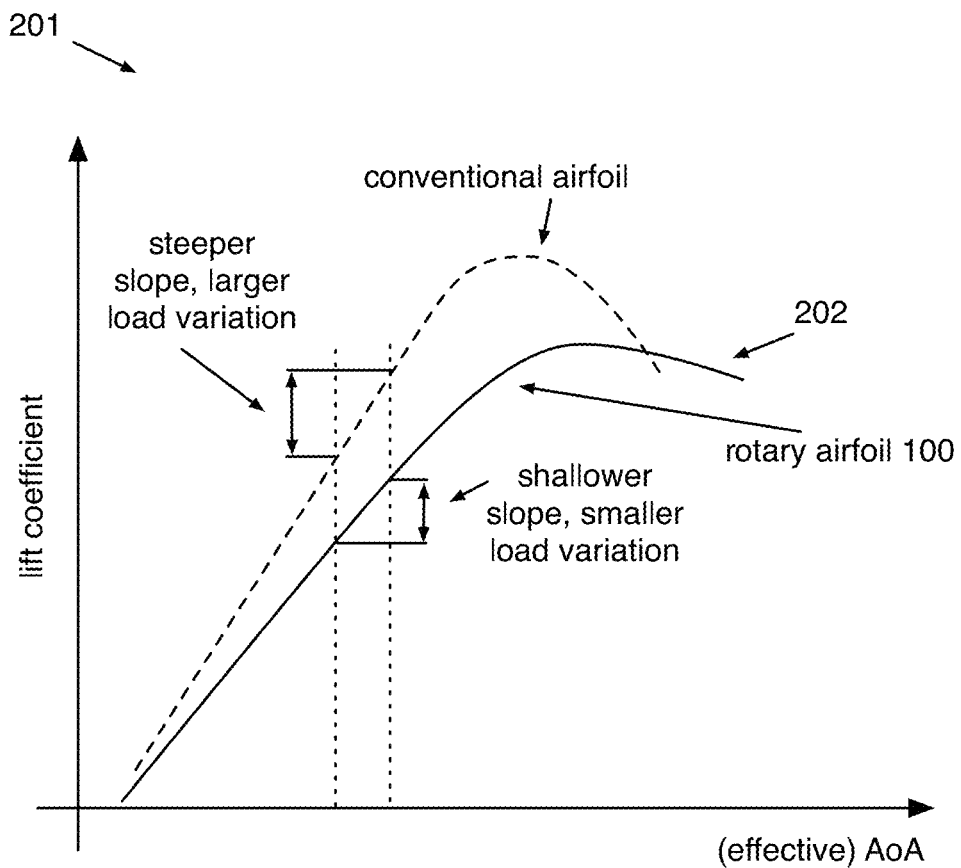
FIG. 4 depicts example curves of lift coefficient variation with angle of attack, and a comparison of an example of the rotary airfoil with an example conventional airfoil.

First, the inventors have discovered that conventional optimization of airfoil shapes to enhance aerodynamic efficiency can have adverse and counterintuitive effects on the acoustic performance of the airfoil and/or propellers utilizing a plurality of rotary airfoils (e.g., propeller blades). This can be caused by inflow conditions varying across the rotor disc (e.g., as shown in FIG. 3), which in turn causes each blade to experience different inflow conditions (e.g., effective angles of attack) and thus produce different aerodynamic forces; the disc loading is thus asymmetric/uneven. The magnitude of loading asymmetry/unevenness can be proportional to the magnitude of undesirable acoustic output, and more efficient airfoils (e.g., defining a steeper lift coefficient curve) can exacerbate the loading asymmetry/unevenness (e.g., as shown in FIG. 4). Thus, variations of the technology can generate and utilize unconventional, counterintuitive airfoil shapes that reduce the impact of inflow condition variations across a rotor disc defined by the rotating propeller, with corresponding benefits of reducing undesirable acoustic output.

Second, variations of the technology can provide efficient forward flight and reduce the acoustic profile of the rotary airfoil in hover for VTOL applications. In such variations, the rotary airfoil operates in different regimes of the lift coefficient curve in the hover and forward flight modes. In such variants, the rotary airfoil can be configured to operate within an acoustic range in the hover mode with a minimum dB level of: less than 30, 40, 50, 55, 60, 65, 70, 75, 80, 85, 90, 95, 100, 105, 110, or any other suitable dB level; and a maximum dB level of 40, 45, 50, 55, 60, 65, 70, 75, 80, 85, 90, 95, 100, 105, 110, 115, 120, more than 120, or any other suitable dB level. In such variants, the rotary airfoil (and/or rotor or aircraft including the airfoil) can be configured to operate within an appropriate acoustic range in the forward mode with a minimum dB level of: less than 30, 40, 50, 55, 60, 65, 70, 75, 80, 85, 90, 95, 100, 105, 110, or any other suitable dB level; and a maximum dB level of 40, 45, 50, 55, 60, 65, 70, 75, 80, 85, 90, 95, 100, 105, 110, 115, 120, more than 120, ranges therebetween, and/or any other suitable dB level. The acoustic range can similarly be determined by transforming this acoustic range into an EPNL scale (EPNdB), A-weighted (dBA), C-weighted (dBC), Z-weighted, CNEL, NDL, SEL, SENEL, Leq, Lmax, and/or other expression of noise level, measured at a distance of 0 m, 10 m, 25 m, 50 m, 100 m, 150 m, 200 m, 300 m, 500 m, 1000 m, and/or any other appropriate proximity; alternatively, the numbers discussed above for the acoustic range can be applied to the aforementioned noise level expressions.

Figure 11:
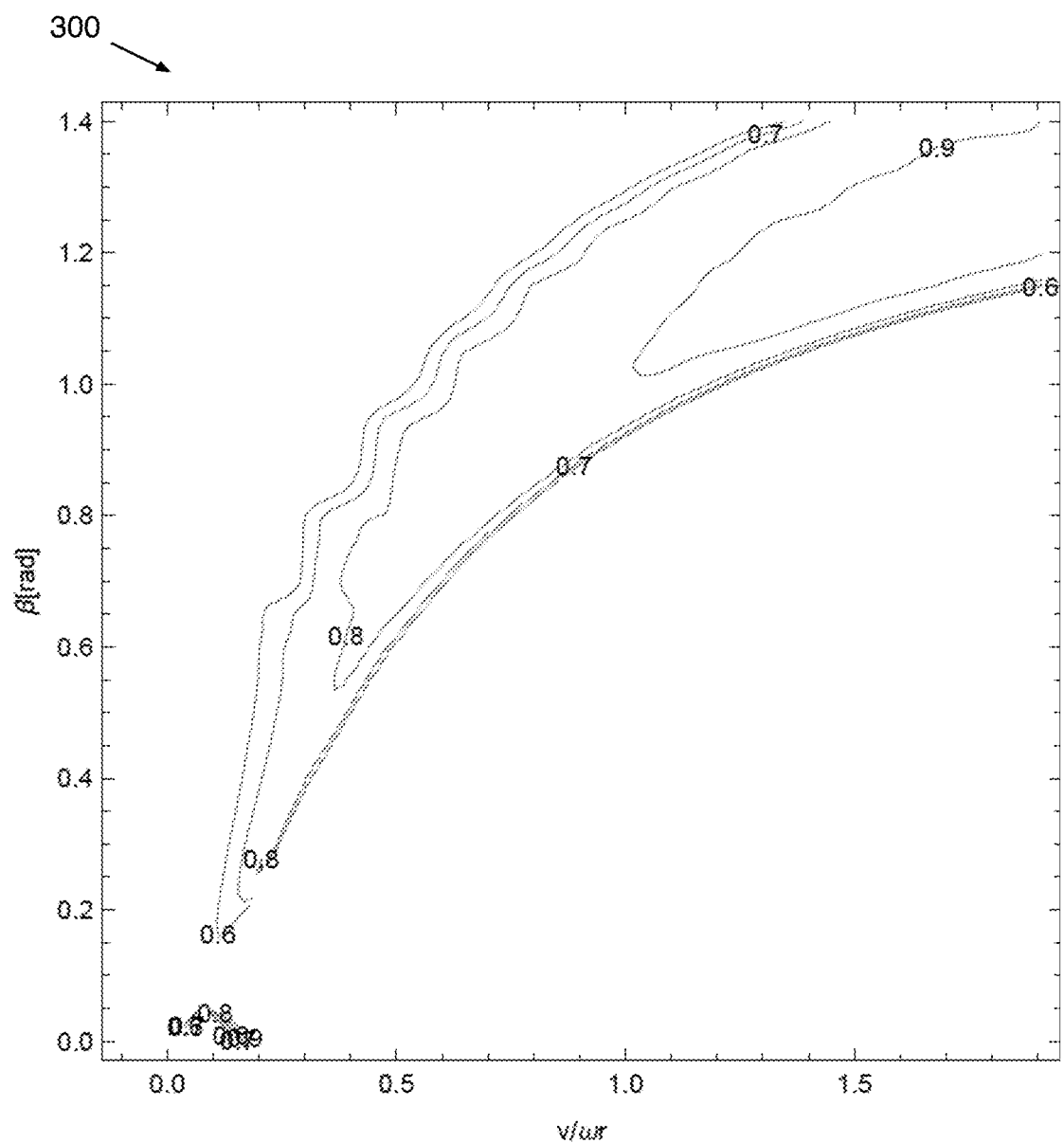
FIG. 11 depicts an example of an efficiency plot of the rotary airfoil.

Conventionally, aircraft operation in hover mode presents larger inflow variations due to ground effects ("dirty air") which correspond to an increase in the noise profile due to loading asymmetry/unevenness. Because hover modes may be used near human-populated regions where it is most critical to reduce the noise profile to meet regulatory requirements and improve user experience, the acoustic profile conferred by variants of this design can be particularly desirable for hover mode operation in human- or civilian-facing applications. In such variations, the rotary airfoil incurs an efficiency penalty (e.g., ~3%) in order to improve the acoustic performance during hover (e.g., during operation in the hover angle of attack range), where the lift coefficient curve has a shallower slope than the lift coefficient curve in the forward angle of attack range. This can result in minimizing the loading asymmetry/unevenness resulting from inflow variation, at the cost of increased drag. This effect can have compounding positive effects when combined with conventional means of improving the acoustic performance of a rotary airfoil, such as: tapering the blade along the length, twisting the blade to change the pitch angle along the length, angling the blade tip (e.g., anhedral angle, dihedral angle), optimizing the airfoil cross section for different Reynold's number ranges on different portions of the blade (e.g., lower Re on inner portion and higher Re on outer portion), and/or other conventional approaches to rotor to noise reduction. However, in such variations the rotary airfoil does not incur a significant efficiency penalty in forward flight—which represents a majority of aircraft operation. By operating in a forward angle of attack range during forward flight, high propulsive efficiency can minimize the cost of fuel and/or electricity supplied to the aircraft, minimize the number of refueling/recharging stops, reduce vehicle weight of energy storage systems, and/or improve the aircraft range. An example efficiency curve 300 for a rotary airfoil is shown in FIG. 11.

Figure 8:
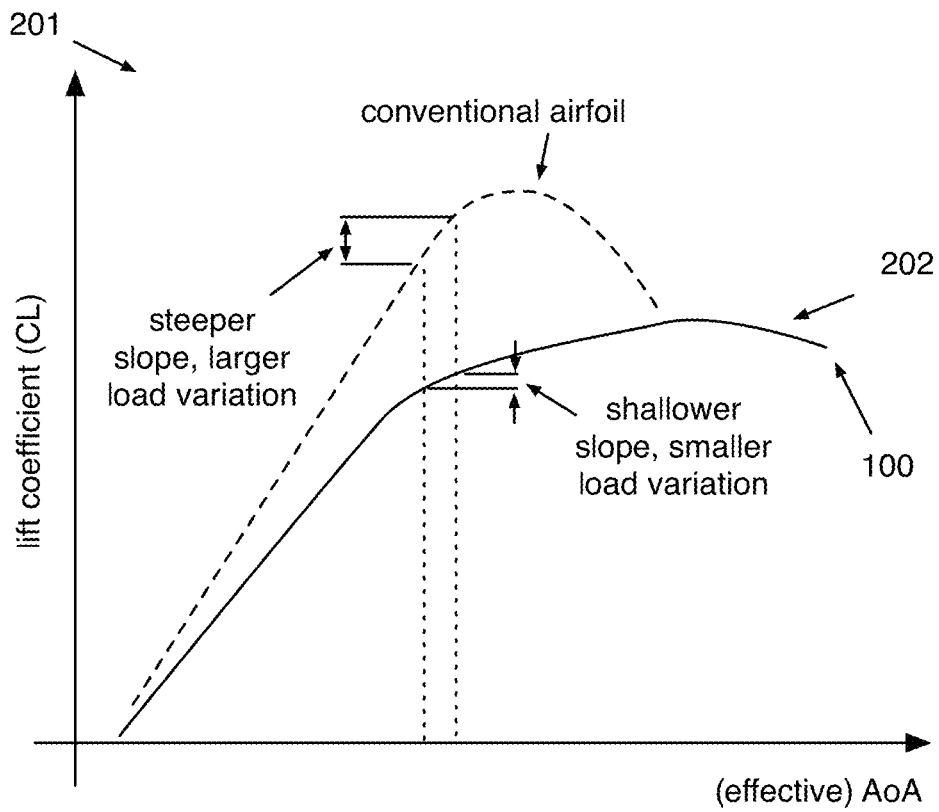
FIG. 8 depicts an example curves of lift coefficient variation with angle of attack, and a comparison of an example of the rotary airfoil with an example conventional airfoil.

Third, variations of the technology define an airfoil geometry where the point of flow separation does not shift as a function of angle of attack (e.g., in the hover range), or shifts less than a predetermined distance (e.g., less than 10%, 5%, 3%, etc, of the chord line) across all operational angle of attack ranges. This can reduce the drag influence of flow separation, allowing the aerodynamic stall and/or max lift condition 210 of the airfoil to occur at higher angles of attack (e.g., greater than 5 deg after semi-critical angle of attack) and resulting in gentle stall behavior 202 as shown in the example in FIG. 8.

Figure 10A:
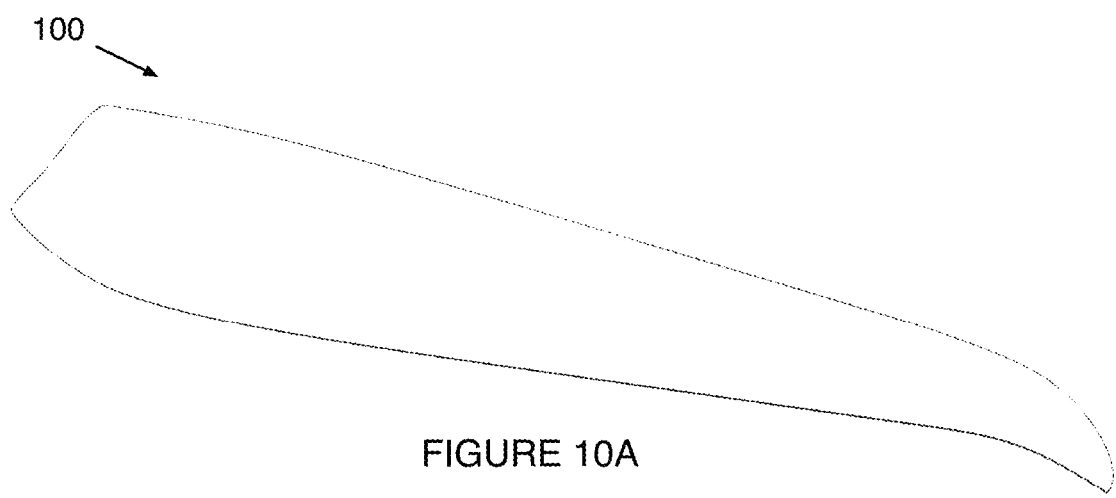
FIG. 10A depicts a perspective view of an example of the rotary airfoil.
Figure 10B:
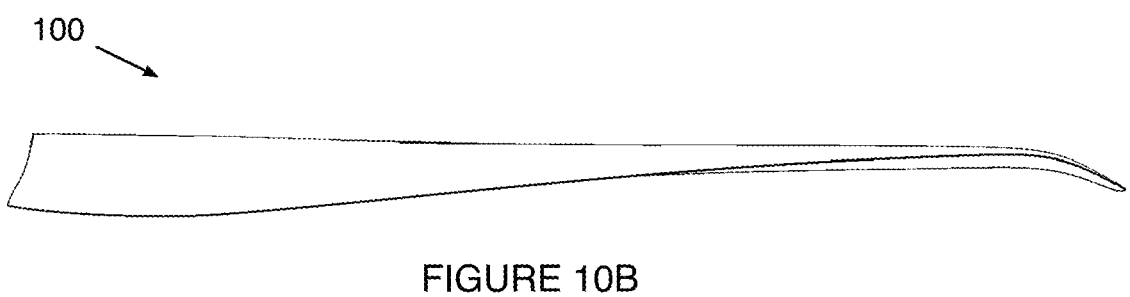
FIG. 10B depicts a side view of an example of the rotary airfoil.
Figure 10C:
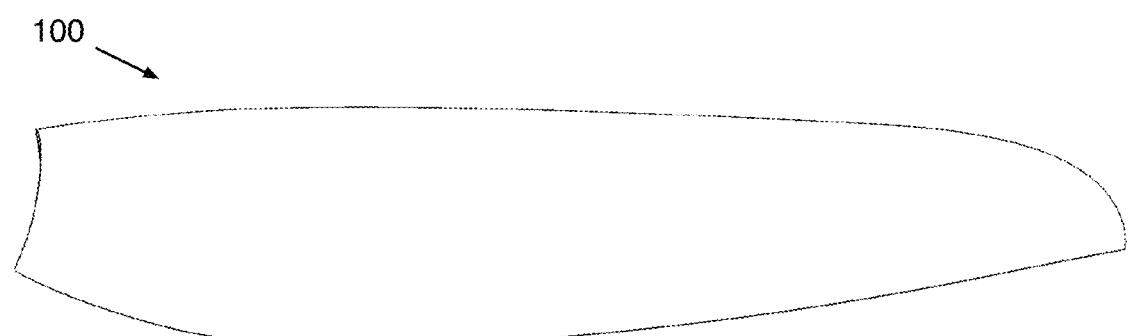
FIG. 10C depicts a top view of an example the rotary airfoil.

Fourth, variations of the technology minimize vibrations of the rotor blade to improve the acoustic performance of the blade with varying inflow conditions. Varying inflow can result from: ambient weather factors such as wind, pressure, ground effects, and other ambient influences; other rotors of the aircraft which can be located in any plane, which can be: coplanar with the disc plane, parallel to the disc plane, intersecting the disc plane, orthogonal to the disc plane, and/or in any orientation relative to the disc plane; and other sources of variable inflow. In such variations, the blade profile offers improved vibration characteristics, improved load distribution, and increasing rigidity in bending and torsion as a result of: tapering the blade along the length (as shown in the examples in FIGS. 10A-C), twisting the blade to change the pitch angle along the length, angling the blade tip (e.g., anhedral angle, dihedral angle), optimizing the airfoil cross section for different Reynold's number ranges on different portions of the blade (e.g., lower Re on inner portion and higher Re on outer portion), and/or other conventional approaches to rotor to noise reduction.

Fifth, variations of the technology can provide airfoils that define a small pitching moment. In such variations, the torque required to maintain a specified blade pitch within a range of variable blade pitches is reduced versus an airfoil that defines a larger pitching moment. Thus, variable-pitch propeller systems can be implemented, using such variations of the technology, with smaller and/or lower-torque variable-pitch actuators, and thus at reduced cost and weight.

Sixth, variations of the technology can provide airfoils that define smoothly varying and gentle stall behavior (e.g., a shallow roll-off of lift coefficient with angle of. attack above the stall angle, as shown in FIG. 4). For example, the airfoils can include a raised feature 125 (e.g., a bump) along the upper surface (e.g., forward of the chordwise midpoint, aft of the chordwise midpoint, etc.), followed by a downward taper, that localizes the boundary layer separation point proximal the raised feature as angle of attack is increased beyond the stall angle. However, variations of the technology can otherwise suitably provide smoothly- and slowly-varying post-stall decrease in lift coefficient.

However, variations of the technology can additionally or alternatively provide any other suitable benefits and/or advantages.

3. System

As shown in FIG. 1, the rotary airfoil 100 defines a cross section and a span, wherein the cross section 110 is a function of the point along the span (e.g., spanwise point) and defines an upper surface 120 and a lower surface 130 at each spanwise point. The rotary airfoil 100 also defines, at a cross section, a lift coefficient ($C_L$) that is a function of the angle of attack at which the airfoil is rotated through the air. However, the rotary airfoil 100 can additionally or alternatively include or define any other suitable components or features.

The rotary airfoil 100 functions to generate an aerodynamic force as it is rotated through a fluid (e.g., air), which can be used to propel a vehicle (e.g., aircraft). The rotary airfoil can define a single airfoil cross sectional profile or multiple cross sectional profiles.

Figure 16:
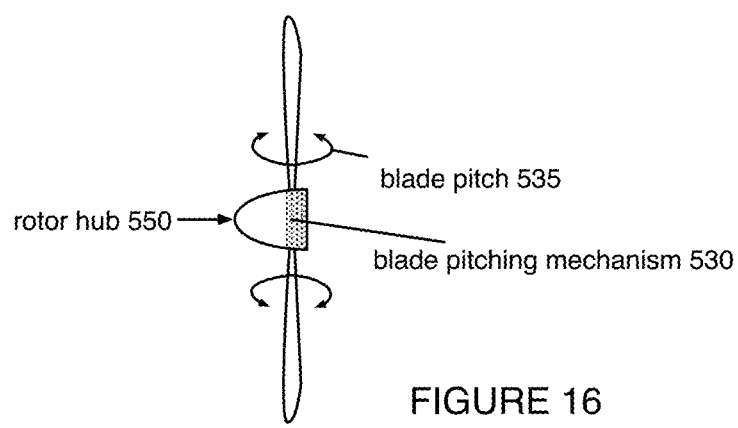
FIG. 16 depicts an example of the blade pitching mechanism.

The rotary airfoil is preferably used in a propulsion system, wherein the propulsion system can include: a set of rotary airfoils, a rotor hub that mounts the set of rotary airfoils (e.g., 3, 4, 5, 6, or any other suitable number of rotary airfoils), a tilt mechanism that pivots the set of rotary airfoils between a forward configuration and a hover configuration, and a pitching mechanism 530 that changes the pitch angle 535 (and thereby the angle of attack) of the rotary airfoil 100 (e.g., as shown in the example in FIG. 16). However, the propulsion system can additionally or alternatively include or define any other suitable components or features. The propulsion system can be that disclosed in U.S. application Ser. No. 16/430,163, incorporated herein in its entirety by this reference, or be any other suitable propulsion system.

The propulsion system is preferably used in an aircraft, such as a tilt-rotor aircraft, but can additionally or alternatively be used in any other suitable manner. In variants, the aircraft can include multiple propulsion systems (e.g., 4, 6, 8, 10, etc.) distributed about the aircraft body (e.g., evenly distributed about an aircraft center of gravity, unevenly distributed, etc.) or a single propulsion system. When the aircraft includes multiple propulsion systems, the disc plane defined by each propulsion system can be aligned or offset from one or more of the other propulsion systems on the same aircraft. The aircraft can be: manually controlled, automatically controlled, selectively automatically controlled, or otherwise controlled. The aircraft can be that disclosed in U.S. application Ser. No. 16/409,653, incorporated herein in its entirety by this reference, but can be any other suitable aircraft.

Figure 17:
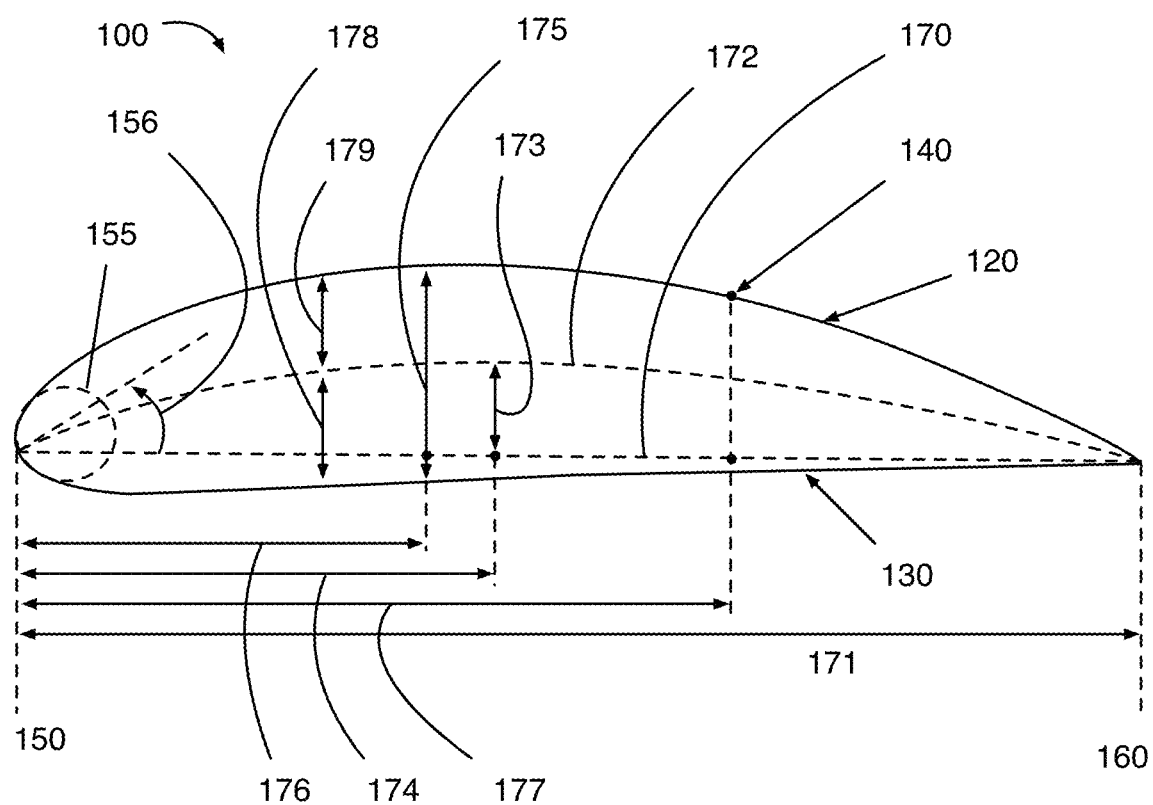
FIG. 17 depicts a diagram of the rotary airfoil cross section.

The cross section of the rotary airfoil 100 preferably defines a leading edge 150, a trailing edge 160, and a chord line 170 extending between the leading edge and trailing edge as shown in FIG. 17. The chord line preferably defines a chord length 171 (L), which can be used as a reference dimension for the airfoil cross section. The chord length L can be: <1 cm, 1 cm, 2 cm, 3 cm, 4 cm, 5 cm, 7 cm, 10 cm, 15 cm, 20 cm, 25 cm, 30 cm, 35 cm, 50 cm, <1 cm, 0.02 m-1 m, 1-5 cm, 5-10 cm, 10-15 cm, 15-25 cm, 25-50 cm, >50 cm, and/or any other appropriate length. The rotary airfoil can define a single chord length or multiple chord lengths along the span of the rotary airfoil. The leading edge is preferably arcuate, but can have any appropriate geometry. The leading edge radius 155 can be a specific dimension, specific dimension relative to the chord length, or variable relative to the chord length along the span of the rotary airfoil. The leading edge can define a leading edge radius, which can be defined relative to the chord length or otherwise dimensioned (e.g., metric units). The leading edge radius can be: 0.01 L, 0.02 L, 03 L, 0.05 L, 0.07 L, 0.1 L, 0.15 L 0.2 L, <0.01 L, 0.01-0.03, 0.03-0.05, 0.01-0.05 L, 0.05-0.07 L, 0.07-0.10 L, 0.05-0.10 L, 0.1-0.2 L, >0.2 L, and/or any appropriate radius. The trailing edge can be arcuate, sharp/pointed, and/or straight cut. In a first variant, trailing edge is arcuate and defines a trailing edge radius. The trailing edge radius can be a specific dimension, specific dimension relative to the chord length, or variable relative to the chord length along the span of the rotary airfoil. The trailing edge radius can be defined relative to the chord length or otherwise dimensioned (e.g., metric units). The trailing edge radius can be: 0, 0.001 L, 0.002 L, 003 L, 0.005 L, 0.007 L, 0.01 L, 0.015 L 0.02 L, 0.03 L, 0.05 L, 0.07 L 0.1 L, <0.005 L, 0.005-0.01 L, 0.01-0.03 L, 0.03-0.05 L, 0.01-0.05 L, 0.05-0.1 L, >0.1 L, and/or any appropriate radius. In a second variant, the trailing edge defines a trailing edge thickness. In a first example of the second variant, the trailing edge thickness can be two times the trailing edge radius. In a second example of the second variant, the trailing edge is straight cut (or approximately straight cut). The trailing edge thickness can be a specific dimension, specific dimension relative to the chord length, or variable relative to the chord length along the span of the rotary airfoil. The trailing edge thickness can be defined relative to the chord length or otherwise dimensioned (e.g., metric units). The trailing edge thickness can be: 0, 0.001 L, 0.002 L, 003 L, 0.005 L, 0.007 L, 0.01 L, 0.015 L 0.02 L, 0.03 L, 0.05 L, 0.07 L 0.1 L, <0.005 L, 0.005-0.01 L, 0.01-0.03 L, 0.03-0.05 L, 0.01-0.05 L, 0.05-0.1 L, >0.1 L, and/or any appropriate thickness.

Figure 5:
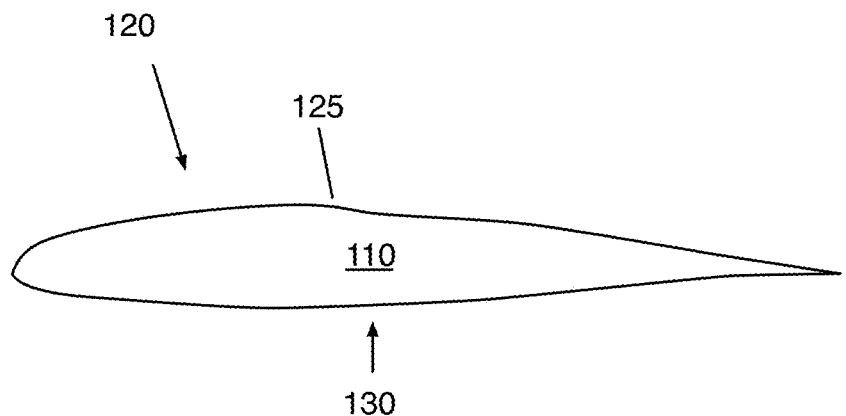
FIG. 5 depicts an example cross section of an embodiment of the rotary airfoil.

The cross section of the rotary airfoil defines a thickness between an upper surface and a lower surface. In a first variant, the upper and lower surfaces are above and below the chord line, respectively, as shown in FIGS. 1 and 5. In a second variant, the upper surface and the lower surface both lie above the chord line. In a third variant, the upper surface lies above the chord line and a portion of the lower surface (proximate the trailing edge) lies above the chord line. The upper and lower surfaces can be asymmetric (e.g., defining a rotary airfoil that is asymmetric about the chord line), but can alternatively be symmetric (e.g., defining a symmetric airfoil). The cross section can vary in any suitable manner along the span of the rotary airfoil. For example, the cross section can twist along the span while maintaining the same scaled shape (e.g., wherein the ratio between the thickness at each chordwise section and the chord line remains static as the chord line changes length along the span, wherein the camber line maintains the same shape along the span as the length of the camber line changes, etc.)

such that the angle of attack of each point along the span differs. In another example, the cross-sectional shape can vary along the span (e.g., wherein the upper surface defines a more pronounced raised feature at a first portion of the span, and the raised feature is less pronounced in a second portion of the span). However, the cross section can define any other suitable spanwise variation (including, for example, no variation).

The upper surface functions to manipulate the flow field of the inflowing air 101 such that the average velocity of the flow field is higher than that of the flow field proximal the lower surface and the average static pressure is lower. The lower surface (e.g., the pressure surface) functions to manipulate the flow field of the inflowing air such that the average velocity of the flow field is lower than that of the flow field proximal the upper surface, and the average static pressure is higher (e.g., in the hover configuration).

The rotary airfoil can have any appropriate thickness. The thickness for a cross section of the rotary airfoil is defined as the distance between the upper and lower surfaces at a chordwise location. The rotary airfoil can have any appropriate maximum thickness. The maximum thickness of the rotary airfoil can be a specific dimension, specific dimension relative to the chord length, or variable relative to the chord length along the span of the rotary airfoil. The maximum thickness 175 can be defined relative to the chord length or otherwise dimensioned (e.g., metric units). The maximum thickness can be: 0.050 L, 0.075 L, 0.100 L, 0.110 L, 0.115 L, 0.120 L, 0.125 L, 0.130 L, 0.135 L, 0.140 L, 0.150 L, 0.200 L, 0.25 L, <0.075 L, 0.05-0.10 L, 0.100-0.150 L, 0.120-0.130 L, 0.05-0.25 L, >0.25 L, and/or any appropriate thickness. The maximum thickness can occur at any appropriate chordwise location 176. Preferably, the maximum thickness can occur at a chordwise location of: 0.20 L, 0.25 L, 0.30 L, 0.33 L, 0.35 L, 0.36 L, 0.363 L, 0.365 L, 0.37 L, 0.40 L, 0.45 L, 0.50 L, 0.60 L, <0.20 L, 0.20-0.30 L, 0.30-0.40 L, 0.35-0.38 L, 0.40-0.50 L, 0.50-0.60 L, >0.50 L and/or any appropriate chordwise location.

The airfoil thickness preferably defines a camber line 172 extending between the leading edge and the trailing edge. The camber line preferably lies above the chord line, but can have any appropriate geometry. The camber line can define any appropriate maximum camber. The maximum camber 173 of the rotary airfoil can be a specific dimension, specific dimension relative to the chord length, or variable relative to the chord length along the span of the rotary airfoil. The maximum camber can be defined relative to the chord length or otherwise dimensioned (e.g., metric units). The maximum camber can be: 0.01 L, 0.02 L, 03 L, 0.05 L, 0.07 L, 0.10 L, 0.15 L 0.20 L, <0.01 L, 0.01-0.03, 0.03-0.05, 0.01-0.05 L, 0.05-0.07 L, 0.07-0.10 L, 0.05-0.10 L, 0.10-0.20 L, >0.20 L, and/or any appropriate camber. The maximum camber can occur at any appropriate chordwise location 174. Preferably, the maximum camber occurs between the leading edge and the chordwise location of maximum thickness, but can alternately happen between the trailing edge and the chordwise location of maximum thickness, at the same chordwise location as the maximum thickness, or at any appropriate chordwise location. The maximum camber can occur at a chordwise location of: 0.20 L, 0.25 L, 0.26 L, 0.27 L, 0.28 L, 0.29 L, 0.30 L, 0.31 L, 0.32 L, 0.33 L, 0.34 L, 0.35 L, 0.36 L, 0.363 L, 0.365 L, 0.37 L, 0.40 L, 0.45 L, 0.50 L, <0.20 L, 0.20-0.30 L, 0.30-0.40 L, 0.35-0.38 L, 0.40-0.50 L, >0.50 L and/or any appropriate chordwise location. The camber line can define any appropriate leading edge camber angle 156. The leading edge camber angle of a cross section of the rotary airfoil can be a specific dimension or variable along the span of the rotary airfoil. The leading edge camber angle can be: <1 deg, 0 deg, 1 deg, 2 deg, 3 deg, 4 deg, 5 deg, 7 deg, 10 deg, 12 deg, 15 deg, 17 deg, 20 deg, 30 deg, 45 deg, >45 deg, 1-5 deg, 5-10 deg, 10-15 deg, 15-20 deg, 20-30 deg, 30-45 deg, and/or any appropriate angle. The camber line can define any appropriate trailing edge camber angle. The leading trailing edge camber angle of a cross section of the rotary airfoil can be a specific dimension or variable along the span of the rotary airfoil. The trailing edge camber angle can be: <1 deg, 0 deg, 1 deg, 2 deg, 3 deg, 4 deg, 5 deg, 7 deg, 10 deg, 12 deg, 15 deg, 17 deg, 20 deg, 30 deg, 45 deg, >45 deg, 1-5 deg, 5-10 deg, 10-15 deg, 15-20 deg, 20-30 deg, 30-45 deg, and/or any appropriate angle.

The thickness of the airfoil can be measured perpendicular to the camber line ("American convention) and/or measured perpendicular to the chord line ("British convention").

The airfoil thickness can define any appropriate upper camber 178 relative to the upper surface of the airfoil and the chord line. The maximum upper camber preferably occurs between the trailing edge and the chordwise location of maximum camber, but can alternately occur between the leading edge and the chordwise location of maximum camber, at the same chordwise location as the maximum camber, or at any appropriate chordwise location.

The airfoil thickness can define any appropriate lower camber 179 relative to the lower surface of the airfoil and the chord line. Preferably, the maximum lower camber occurs between the leading edge and the chordwise location of maximum upper camber, but can alternately occur between the trailing edge and the chordwise location of maximum upper camber, at the same chordwise location as the maximum upper camber, or at any appropriate chordwise location.

Figure 6:
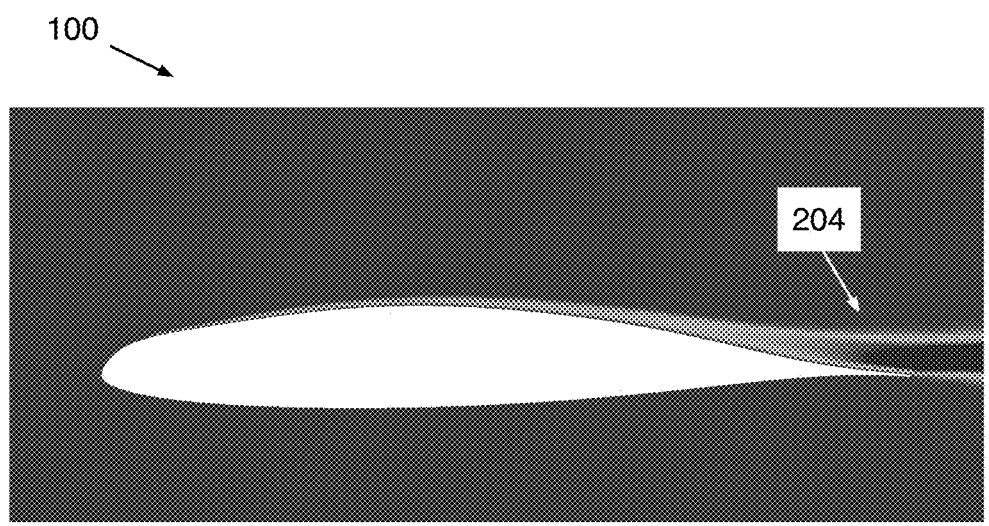
FIG. 6 depicts an example of simulated boundary layer formation, and effective airfoil thickening resulting therefrom, upon the example of the rotary airfoil depicted in FIG. 5 at an angle of attack equal to zero.
Figure 7A:
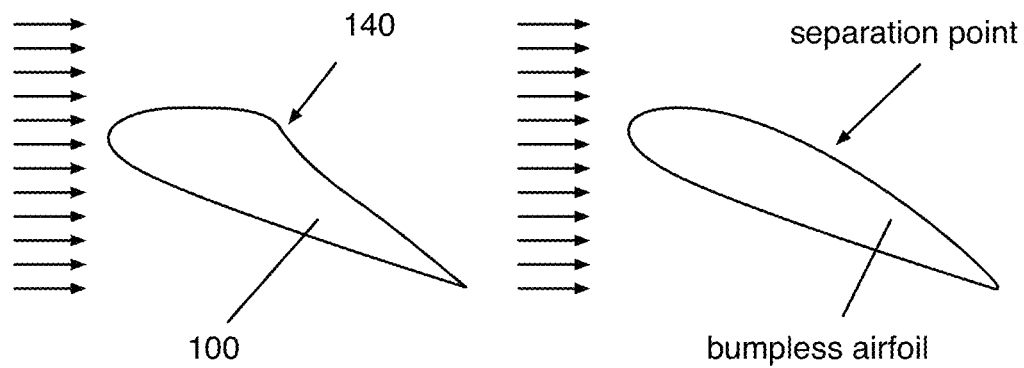
FIG. 7A depicts a diagram of the boundary layer separation point on an example embodiment of the rotary airfoil including a raised feature proximal the leading edge, and on a conventional airfoil omitting the raised feature, at a first angle of attack.
Figure 7B:
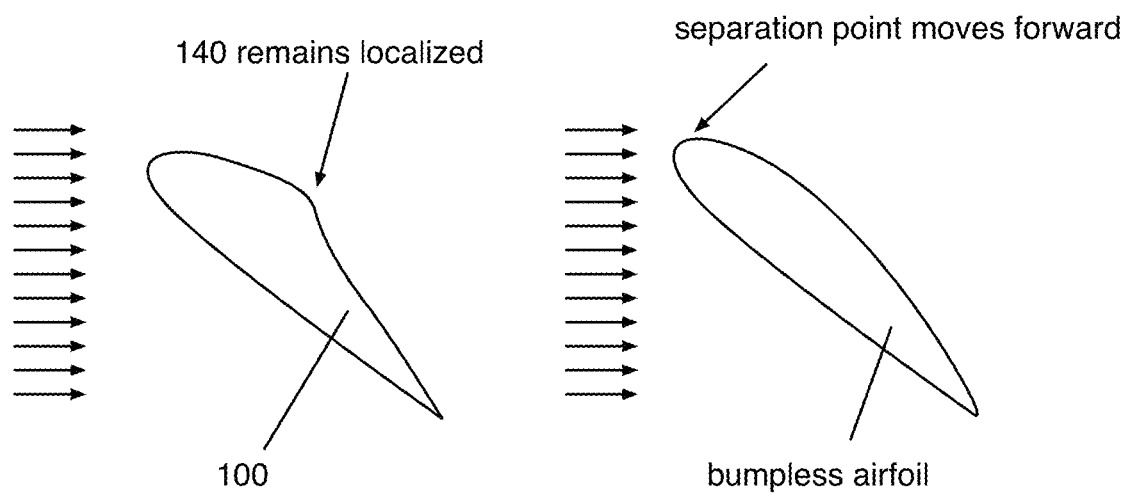
FIG. 7B depicts a diagram of the boundary layer separation point on an example embodiment of the rotary airfoil including a raised feature proximal the leading edge, and on a conventional airfoil omitting the raised feature, at a second angle of attack greater than the first angle of attack depicted in FIG. 7A.

The airfoil thickness can define a semi-critical separation point 140, which functions to create a stagnating zone in the flow atop the airfoil, which thickens the boundary layer and pushes the effective trailing edge upwards away from the upper surface of the airfoil (e.g., as shown in FIG. 6). The thickening of the boundary layer 204 and upward displacement of the effective trailing edge can function to reduce the lift coefficient at a given angle of attack (e.g., flattens the $C_L(\alpha)$ curve). The semi-critical separation point can also function to localize the boundary layer separation point along the upper surface with increasing angle of attack (e.g., as shown in FIGS. 7A-7B), instead of allowing the separation point to move upstream as the angle of attack is increased, leading to "gentle" stalling behavior (e.g., wherein the lift coefficient rolls off slowly with increasing angle of attack past the stall point, as shown by example in FIG. 4). The semi-critical separation point is can be located at a chordwise point 177 of: 0.05 L, 0.10 L, 0.15 L, 0.20 L, 0.25 L, 0.30 L, 0.35 L, 0.40 L, 0.45 L, 0.50 L, 0.55 L, 0.60 L, 0.65 L, 0.70 L, 0.75 L, 0.80 L, 0.85 L, 0.90 L, 0.95 L, <0.25 L, 0.25-0.50 L, 0.50-0.75 L, >0.75 L, 0.20-0.80 L, and/or in any other suitable location along the upper surface.

Figure 12A:
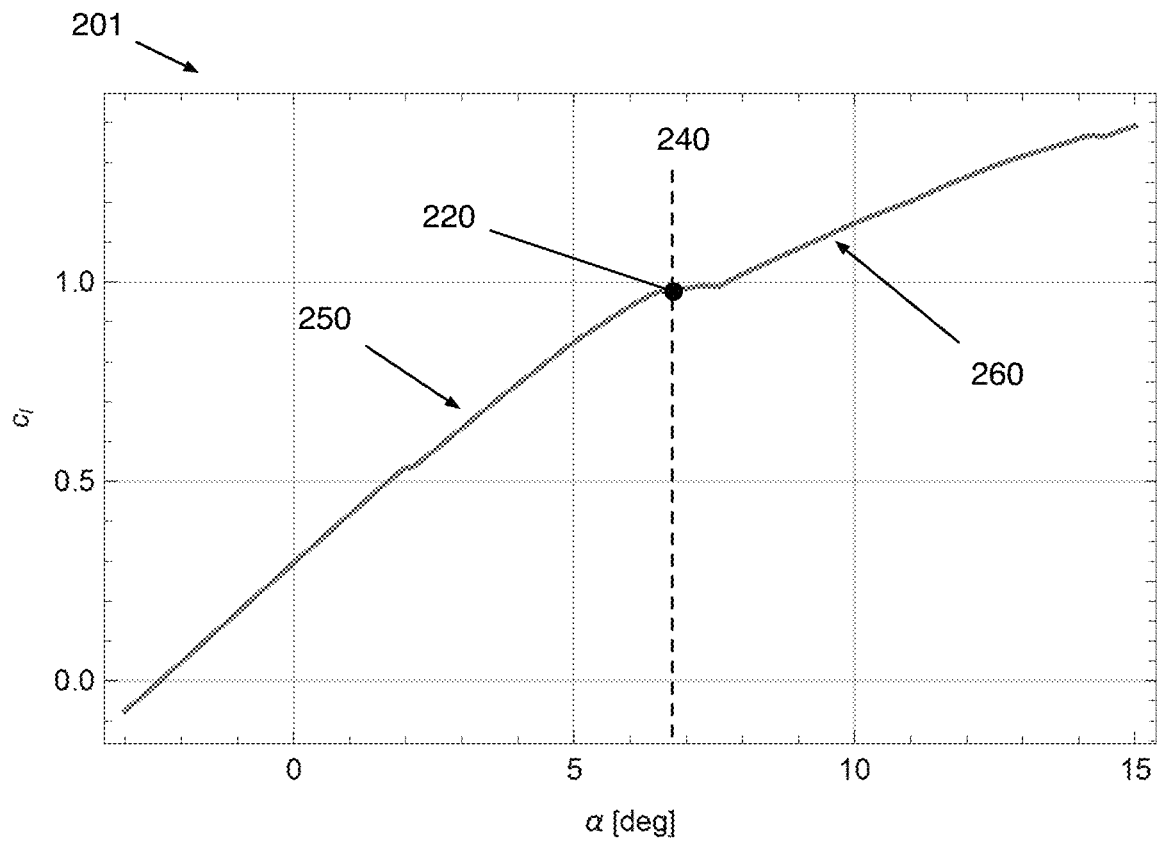
FIG. 12A depicts an example of a lift coefficient curve of the rotary airfoil at a nominal Reynold's number of $10^6$.
Figure 12B:
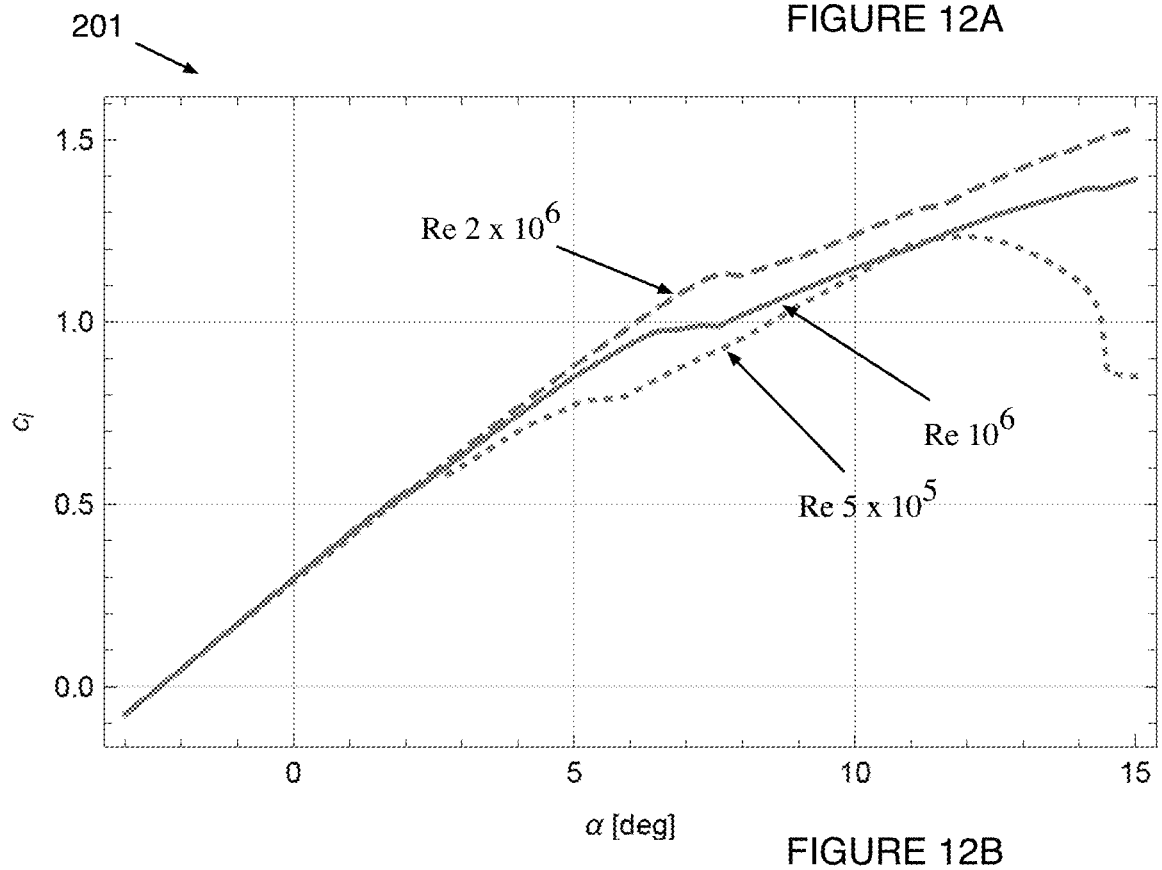
FIG. 12B depicts an example of a lift coefficient curve of the rotary airfoil across a range of Reynold's numbers, where the solid curve corresponds to Reynolds number $10^6$, the dotted curve corresponds to Reynold's number $5 \times 10^6$, and the dashed curve corresponds to Reynold's number $2 \times 10^6$.

The semi-critical separation point can be defined for a range of attack angles and/or range of Reynold's numbers as shown in the examples in FIGS. 12A-B. The Reynold's number can be: 10 k, 30 k, 50 k, 100 k, 200 k, 300 k, 400 k, 600 k, 800 k, 1000 k, 1500 k, 2000 k, 3000 k, 5000 k, 10000 k, <50 k, 50 k-100 k, 50 k-1000 k, 50 k-10000 k, 100 k-300 k, 300 k-1000 k, 1000 k-10,000 k, >1000 k, >10M, and/or any other appropriate Reynold's number range. The semi-critical attack angles can be: 0 deg, 1 deg, 2 deg, 3 deg, 4 deg, 5 deg, 5.5 deg, 6 deg, 6.5 deg, 7 deg, 8 deg, 9 deg, 10 deg, 11 deg, 12 deg, 13 deg, 14 deg, 15 deg, >15 deg, <0 deg, 5-10 deg, 6-8 deg, 8-10 deg, 1-6 deg, 10-15 deg, and/or any other appropriate angle.

The semi-critical separation point can be defined by one or more separation features arranged along one or more chordwise or spanwise points along the airfoil. The separation feature can define the semi-critical separation point before, on, or after the separation feature. Examples of separation features that can be used include: a sphere segment, catenoid, conoid, lune, wedge, cone, teardrop, and/or separation features with any other suitable geometry.

In a first variant, as shown in FIG. 5, the upper surface of the airfoil cross section preferably defines a separation feature followed (in the chordwise direction) by a downward taper, which defines the semi-critical separation point. In a specific example, the cross section defines a bump and subsequent taper having a shape substantially as shown in FIG. 5. In alternative examples, the separation can have any other suitable shape (e.g., scale-invariant dimensions, non-dimensional shape, etc.), such as a groove, channel, change in surface roughness, and/or different feature.

In some variations, the lower surface of the airfoil can define a bump substantially as described above in relation to the upper surface. The bump can be identically shaped and positioned in relation to the bump on the upper surface of the cross section but can alternatively be asymmetrically shaped and/or positioned in relation to the bump on the upper surface (e.g., a more or less pronounced bump, positioned further towards or away from the leading edge than the upper bump, etc.). In further alternatives, the bump can be omitted from the upper surface and included solely on the lower surface.

In a second variant, the semi-critical separation point is related to the specific geometry of the cross section, such as: a change in curvature of the upper camber, a change in curvature of the lower camber, a change in curvature of the camber, local maximum in the camber, local maximum in the upper camber, and/or local maximum in the lower camber.

In a first example, the airfoil cross section is defined by Table 1. In a second example, the airfoil cross section is defined by Table 2. However, the airfoil cross sections can be otherwise defined.

TABLE 1

| Chordwise position (x/L) | Thickness position (t/L) |
| --- | --- |
| 1 | 0 |
| 0.9686 | 0.003 |
| 0.9372 | 0.0064 |
| 0.9059 | 0.0107 |
| 0.8747 | 0.0159 |
| 0.8436 | 0.0222 |
| 0.8126 | 0.0291 |
| 0.7819 | 0.0363 |
| 0.7513 | 0.0434 |
| 0.721 | 0.0501 |
| 0.691 | 0.0561 |
| 0.6613 | 0.0616 |
| 0.6319 | 0.0663 |
| 0.6029 | 0.0705 |
| 0.5742 | 0.0742 |
| 0.546 | 0.0773 |
| 0.5182 | 0.08 |
| 0.491 | 0.0822 |
| 0.4642 | 0.0839 |
| 0.4379 | 0.0852 |
| 0.4122 | 0.0859 |

TABLE 1-continued

| Chordwise position (x/L) | Thickness position (t/L) |
| --- | --- |
| 0.3871 | 0.086 |
| 0.3626 | 0.0857 |
| 0.3387 | 0.0848 |
| 0.3155 | 0.0835 |
| 0.2929 | 0.0817 |
| 0.271 | 0.0797 |
| 0.2499 | 0.0774 |
| 0.2295 | 0.0749 |
| 0.2098 | 0.0723 |
| 0.191 | 0.0697 |
| 0.1729 | 0.067 |
| 0.1557 | 0.0644 |
| 0.1393 | 0.0619 |
| 0.1237 | 0.0594 |
| 0.109 | 0.057 |
| 0.0952 | 0.0546 |
| 0.0822 | 0.0521 |
| 0.0702 | 0.0495 |
| 0.0591 | 0.0468 |
| 0.0489 | 0.0439 |
| 0.0397 | 0.0406 |
| 0.0314 | 0.037 |
| 0.0241 | 0.0329 |
| 0.0177 | 0.0283 |
| 0.0123 | 0.0233 |
| 0.0079 | 0.0182 |
| 0.0044 | 0.0133 |
| 0.002 | 0.0086 |
| 0.0005 | 0.004 |
| 0 | 0 |
| 0.0005 | −0.0029 |
| 0.002 | −0.0053 |
| 0.0044 | −0.0075 |
| 0.0079 | −0.0097 |
| 0.0123 | −0.0121 |
| 0.0177 | −0.0144 |
| 0.0241 | −0.0167 |
| 0.0314 | −0.0189 |
| 0.0397 | −0.021 |
| 0.0489 | −0.0231 |
| 0.0591 | −0.025 |
| 0.0702 | −0.0269 |
| 0.0822 | −0.0286 |
| 0.0952 | −0.0302 |
| 0.109 | −0.0317 |
| 0.1237 | −0.0331 |
| 0.1393 | −0.0344 |
| 0.1557 | −0.0355 |
| 0.1729 | −0.0365 |
| 0.191 | −0.0374 |
| 0.2098 | −0.0381 |
| 0.2295 | −0.0387 |
| 0.2499 | −0.0392 |
| 0.271 | −0.0396 |
| 0.2929 | −0.0398 |
| 0.3155 | −0.0398 |
| 0.3387 | −0.0397 |
| 0.3626 | −0.0394 |
| 0.3871 | −0.039 |
| 0.4122 | −0.0383 |
| 0.4379 | −0.0375 |
| 0.4642 | −0.0364 |
| 0.491 | −0.0351 |
| 0.5182 | −0.0336 |
| 0.546 | −0.0319 |
| 0.5742 | −0.0299 |
| 0.6029 | −0.0277 |
| 0.6319 | −0.0252 |
| 0.6613 | −0.0224 |
| 0.691 | −0.0194 |
| 0.721 | −0.0162 |
| 0.7513 | −0.0129 |
| 0.7819 | −0.0095 |
| 0.8126 | −0.0063 |
| 0.8436 | −0.0033 |
| 0.8747 | −0.0008 |

TABLE 1-continued

| Chordwise position (x/L) | Thickness position (t/L) |
|---|---|
| 0.9059 | 0.001 |
| 0.9372 | 0.0019 |
| 0.9686 | 0.0017 |
| 1 | 0 |

TABLE 2

| Chordwise position (x/L) | Thickness position (t/L) |
|---|---|
| 1 | 0 |
| 0.9686 | 0.0029 |
| 0.9372 | 0.0063 |
| 0.9059 | 0.0105 |
| 0.8747 | 0.0155 |
| 0.8436 | 0.0214 |
| 0.8126 | 0.0278 |
| 0.7819 | 0.0345 |
| 0.7513 | 0.041 |
| 0.721 | 0.0471 |
| 0.691 | 0.0528 |
| 0.6613 | 0.0579 |
| 0.6319 | 0.0626 |
| 0.6029 | 0.0667 |
| 0.5742 | 0.0705 |
| 0.546 | 0.074 |
| 0.5182 | 0.0771 |
| 0.491 | 0.0799 |
| 0.4642 | 0.0823 |
| 0.4379 | 0.0842 |
| 0.4122 | 0.0857 |
| 0.3871 | 0.0867 |
| 0.3626 | 0.0871 |
| 0.3387 | 0.087 |
| 0.3155 | 0.0864 |
| 0.2929 | 0.0853 |
| 0.271 | 0.0838 |
| 0.2499 | 0.0819 |
| 0.2295 | 0.0797 |
| 0.2098 | 0.0772 |
| 0.191 | 0.0746 |
| 0.1729 | 0.0719 |
| 0.1557 | 0.069 |
| 0.1393 | 0.0661 |
| 0.1237 | 0.0632 |
| 0.109 | 0.0602 |
| 0.0952 | 0.0571 |
| 0.0822 | 0.0539 |
| 0.0702 | 0.0507 |
| 0.0591 | 0.0472 |
| 0.0489 | 0.0436 |
| 0.0397 | 0.0398 |
| 0.0314 | 0.0356 |
| 0.0241 | 0.0312 |
| 0.0177 | 0.0264 |
| 0.0123 | 0.0214 |
| 0.0079 | 0.0165 |
| 0.0044 | 0.012 |
| 0.002 | 0.0077 |
| 0.0005 | 0.0034 |
| 0 | 0 |
| 0.0005 | −0.0023 |
| 0.002 | −0.0044 |
| 0.0044 | −0.0065 |
| 0.0079 | −0.0088 |
| 0.0123 | −0.0111 |
| 0.0177 | −0.0134 |
| 0.0241 | −0.0156 |
| 0.0314 | −0.0177 |
| 0.0397 | −0.0197 |
| 0.0489 | −0.0216 |
| 0.0591 | −0.0234 |

TABLE 2-continued

| Chordwise position (x/L) | Thickness position (t/L) |
|---|---|
| 0.0702 | −0.025 |
| 0.0822 | −0.0265 |
| 0.0952 | −0.0278 |
| 0.109 | −0.029 |
| 0.1237 | −0.03 |
| 0.1393 | −0.0308 |
| 0.1557 | −0.0315 |
| 0.1729 | −0.032 |
| 0.191 | −0.0323 |
| 0.2098 | −0.0324 |
| 0.2295 | −0.0324 |
| 0.2499 | −0.0321 |
| 0.271 | −0.0317 |
| 0.2929 | −0.0311 |
| 0.3155 | −0.0303 |
| 0.3387 | −0.0293 |
| 0.3626 | −0.0281 |
| 0.3871 | −0.0268 |
| 0.4122 | −0.0253 |
| 0.4379 | −0.0237 |
| 0.4642 | −0.022 |
| 0.491 | −0.0201 |
| 0.5182 | −0.0182 |
| 0.546 | −0.0161 |
| 0.5742 | −0.014 |
| 0.6029 | −0.0119 |
| 0.6319 | −0.0097 |
| 0.6613 | −0.0075 |
| 0.691 | −0.0053 |
| 0.721 | −0.0032 |
| 0.7513 | −0.0013 |
| 0.7819 | 0.0004 |
| 0.8126 | 0.0017 |
| 0.8436 | 0.0027 |
| 0.8747 | 0.0031 |
| 0.9059 | 0.0031 |
| 0.9372 | 0.0026 |
| 0.9686 | 0.0016 |
| 1 | 0 |

In a first variation of the first example, the airfoil cross section is defined by a set of at least 5 points selected from Table 1. In a second variation of the first example, the airfoil cross section is defined by a set of at least 10 points selected from Table 1. In a third variation of the first example, the airfoil cross section is defined by every point in Table 1. In a fourth variation of the first example, each point is within a margin of the value in Table 1, where the margin can be: <0.0001, 0.0001, 0.0005, 0.001, 0.005, 0.01, and/or any appropriate margin. The margin can be the same or different for the chordwise position (x/L) and the thickness position (t/L).

In a first variation of the second example, the airfoil cross section is defined by a set of at least 5 points selected from Table 2. In a second variation of the second example, the airfoil cross section is defined by a set of at least 10 points selected from Table 2. In a third variation of the second example, the airfoil cross section is defined by every point in Table 2. In a fourth variation of the second example, each point is within a margin of the value in Table 2, where the margin can be: <0.0001, 0.0001, 0.0005, 0.001, 0.005, 0.01, and/or any appropriate margin. The margin can be the same or different for the chordwise position (x/L) and the thickness position (t/L).

In a third example, the rotary airfoil can define a first airfoil cross section defined by Table 1 and a second airfoil cross section defined by Table 2. The first and second airfoil cross sections can be associated with different spanwise portions of the airfoil, and/or combined with any other suitable cross sections. Between the first and second cross sections, the airfoil blade can include any suitable blending, interpolation, and/or other smoothing.

The rotary airfoil can define a span of any appropriate length (e.g., blade length). The span can be sized relative to a cross sectional chord length, independent of the chord length, and/or any appropriate length. The span can be: 5 L, 10 L, 15 L, 20 L, 25 L, 50 L, <5 L, 5-25 L, 25-50 L, >50 L, <5 cm, 5 cm, 10 cm, 25 cm, 30 cm, 35 cm, 40 cm, 45 cm, 50 cm, 60 cm, 70 cm, 80 cm, 90 cm, 1 m, 1.25 m, 1.5 m, 1.75 m, 2.5 m, 5 m, 10 m, 15 m, 20 m, 5-25 cm, 25-50 cm, 50-100 cm, 0.1 m-15 m, 1-2 m, 1-4 m, 5-10 m, 10-20 m, >20 m, and/or any other suitable length.

The rotary airfoil can define any appropriate pitch angle. The pitch angle can be static or variable. The pitch angle can be defined as the angle of the chord line with respect to the rotor disc plane at any appropriate spanwise position on the blade. In a specific example, the pitch angle is defined relative to a spanwise position of 75% the length (radially outward). The pitch angle of the rotary airfoil can be: <−15 deg, −10 deg, −5 deg, −5 deg, −4 deg, −3 deg, −2 deg, −1 deg, 0 deg, 1 deg, 2 deg, 3 deg, 4 deg, 5 deg, 7 deg, 10 deg, 12 deg, 15 deg, 17 deg, 20 deg, 21 deg, 22 deg, 25 deg, 30 deg, 35 deg, 45 deg, 60 deg, 90 deg, 1-5 deg, 5-10 deg, 10-15 deg, 15-20 deg, 20-25 deg, 25-30 deg, 30-35 deg, 35-45 deg, >45 deg, and/or any appropriate pitch angle. In a first variant, the pitch angle is variable via the pitching mechanism. In a second variant, the effective angle of attack is controlled by motor RPM, with different speeds corresponding to different effective pitch angles.

The rotary airfoil can define a twist angle along the span. The twist angle can be a change in the angle of the chord line (e.g., relative to blade geometry, relative to the rotor disc plane, etc.) across a spanwise segment of the rotary airfoil (e.g., across the full length of the airfoil) and/or otherwise defined. The (absolute value of) twist angle can be 0 deg, 1 deg, 2 deg, 3 deg, 4 deg, 5 deg, 7 deg, 10 deg, 12 deg, 15 deg, 17 deg, 20 deg, 25 deg, 30 deg, 35 deg, 40 deg, 45 deg, 50 deg, 10-60 deg, 20-50 deg, 1-5 deg, 5-10 deg, 10-15 deg, 15-20 deg, 20-25 deg, 25-30 deg, 30-35 deg, 25-35 deg, 35-40 deg, 40-50 deg, >50 deg, and/or any appropriate twist angle.

The rotary airfoil can define any appropriate spanwise geometry. Preferably, the upper surface of the rotary airfoil is generally in a vesica piscis geometry, but can additionally or alternately be tapered toward the tip, have constant cross sectional area, have variable cross sectional area, and/or have any other appropriate geometry. The taper angle can be the same or different on the leading edge, the trailing edge of the airfoil, on an inner portion of the rotary airfoil, and/or at the tip. In an example in FIG. 19C, angles 193, 194, 195, and 196 can be the same or different. These angles can be any appropriate angle. 193 and 195 can be: <−10 deg, −10 deg, −5 deg, −4 deg, −3 deg, −2 deg, −1 deg, 0 deg, 1 deg, 2 deg, 3 deg, 4 deg, 5 deg, 7 deg, 10 deg, 12 deg, 15 deg, 17 deg, 20 deg, 30 deg, 45 deg, 1-5 deg, 5-10 deg, 10-15 deg, 15-20 deg, 30-30 deg, 30-45 deg, >20 deg, and/or any appropriate angle. 194 and 196 can be 0 deg, 1 deg, 2 deg, 3 deg, 4 deg, 5 deg, 7 deg, 10 deg, 12 deg, 15 deg, 17 deg, 20 deg, 30 deg, 45 deg, 60 deg, 90 deg, 1-5 deg, 5-10 deg, 10-15 deg, 15-20 deg, 30-30 deg, 30-45 deg, 45-60 deg, 60-90 deg, >20 deg, and/or any appropriate angle.

The tip of the rotary airfoil can have any appropriate geometry. The tip can be flat, rounded, or pointed, and can be a point, edge, face, and/or other appropriate geometry. The rotary airfoil can have any appropriate tip angle 198, as shown in FIG. 19D. The blade tip can be anhedral, dihedral, un-angled, and/or at any suitable angle. The tip angle can be: 0 deg, 1 deg, 2 deg, 3 deg, 4 deg, 5 deg, 7 deg, 10 deg, 12 deg, 15 deg, 17 deg, 20 deg, 25 deg, 30 deg, 37 deg, 45 deg, 52 deg, 60 deg, 1-5 deg, 5-10 deg, 10-15 deg, 15-20 deg, 30-30 deg, 30-45 deg, >60 deg, and/or any appropriate angle.

Figure 19A:
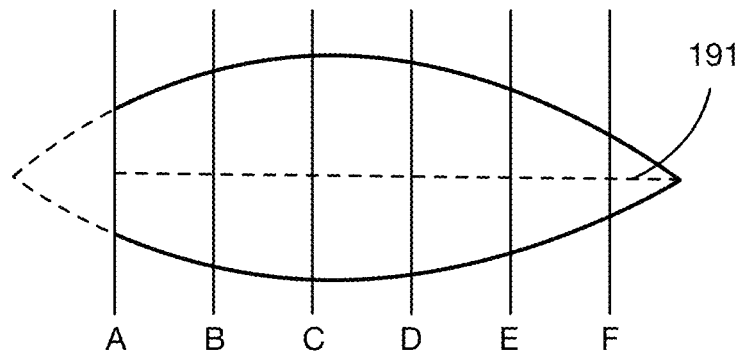
FIG. 19A depicts a diagrammatic representation of the rotary airfoil from a top view.
Figure 19B:
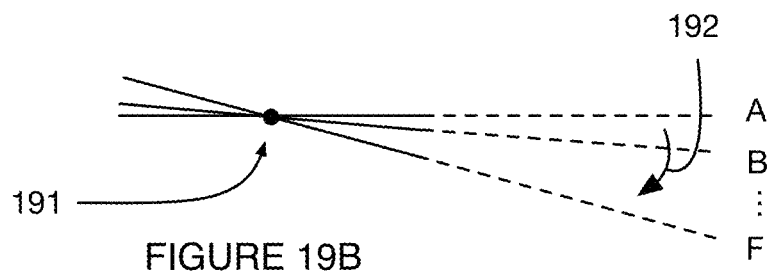
FIG. 19B depicts a diagrammatic representation of the rotary airfoil twist angle.
Figure 19C:
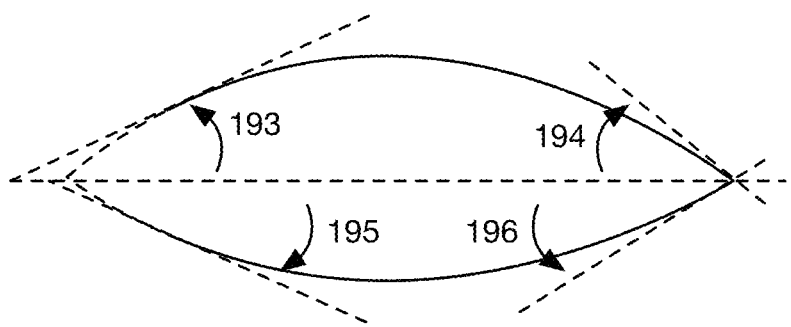
FIG. 19C depicts a diagrammatic representation of the rotary airfoil from a top view.
Figure 19D:
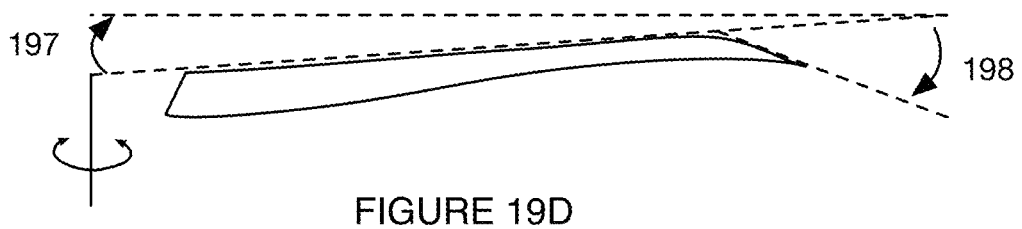
FIG. 19D depicts a diagrammatic representation of the rotary airfoil from a side view.

The rotary airfoil can have any appropriate twist angle 192, as shown in FIG. 19A and FIG. 19B. The twist angle preferably changes the effective angle of attack along the span 191 of the rotary airfoil. The blade twist angle is preferably defined between the innermost and outer (tip) cross sections, but can be defined between any two cross sections, a section of the blade, and/or at any suitable angle. The twist angle can be: 0 deg, 1 deg, 2 deg, 3 deg, 4 deg, 5 deg, 7 deg, 10 deg, 12 deg, 15 deg, 17 deg, 20 deg, 25 deg, 30 deg, 35 deg, 40 deg, 45 deg, 1-5 deg, 5-10 deg, 10-15 deg, 15-20 deg, 20-25 deg, 25-30 deg, 30-35 deg, 25-35 deg, 35-40 deg, >40 deg, and/or any appropriate twist angle.

The rotary airfoil can have any appropriate rotary airfoil mounting angle 197, as shown in FIG. 19D. Preferably, angle 197 is 0 deg, but can be positive or negative. The rotary airfoil mounting angle can be: −10 deg, −5 deg, −4 deg, −3 deg, −2 deg, −1 deg, 0 deg, 1 deg, 2 deg, 3 deg, 4 deg, 5 deg, 7 deg, 10 deg, 12 deg, 15 deg, 17 deg, 20 deg, <0 deg, 1-5 deg, 5-10 deg, 10-20 deg, >20 deg.

The rotary airfoil can be constructed with any appropriate materials using any appropriate manufacturing technique. The rotary airfoil can be composite (e.g., carbon fiber, fiberglass, etc.), metal, metal alloy, plastic, and/or a combination thereof (e.g., internal support members of different material/manufacture), but can additionally or alternately include any appropriate materials. The rotary airfoil can be solid, hollow (with a single or multiple cavities), and/or otherwise constructed. The rotary airfoil can have any appropriate mass. The rotary airfoil can be: <1 kg, 1-3 kg, 3-5 kg, 5-10 kg, 10-50 kg, 50-100 kg, 100-250 kg, >250 kg and/or any other appropriate mass.

The rotor hub rotatably mounts rotary airfoil blade(s). The rotor hub can mount any suitable number of rotary airfoil blades. There are preferably 5 rotary airfoil blades, but there can be 2, 3, 4, 6, >6 blades, and/or any appropriate number of blades. The blades can have any appropriate relative relationship about the axis of rotation. In a first variant, the blades are symmetrically mounted. In a second variant, the blades are mounted in the arrangement described in U.S. application Ser. No. 16/430,163, filed Jun. 3, 2019, which is incorporated in its entirety by this reference. The rotary airfoil blades are preferably radially mounted about the axis of rotation via mechanical bonding, fasteners, and/or other mounting technique. The rotary blades can be directly and/or indirectly mounted. The rotary airfoil blades can be partially and/or fully supported by the blade pitching mechanism and/or other component. The rotary airfoil blades can be integrated into the rotor hub (e.g., one component), separate from the rotor hub, and/or otherwise configured. In a first example, there is a separate power source connected to the rotor hub, such as an engine, rotor of a motor, or other power source. In a second example, the hub is integrated into the stator of an electric motor.

The optional pitching mechanism can change the angle of attack of one or more rotary airfoil blades on the rotor. There can be a single pitching mechanism or multiple pitching mechanisms (e.g., one per rotor, multiple per rotor, one per blade, etc.). The pitching mechanism can actuate blades independently or actuate multiple simultaneously. The pitching mechanism can be integrated into the rotor hub, connected/mounted to the rotor hub, and/or separate from the rotor hub. Preferably, the pitching mechanism can be electromechanically actuated, but can additionally or alternately be hydraulic, pneumatic, and/or ground adjustable (by a human operator or other input). The pitching mechanism can be variable between a finite or infinite number of positions. The pitching mechanism can be: a controllable-pitch propeller (CPP), a swashplate, a ground adjustable rotor, and/or other pitching mechanism.

Figure 18A:
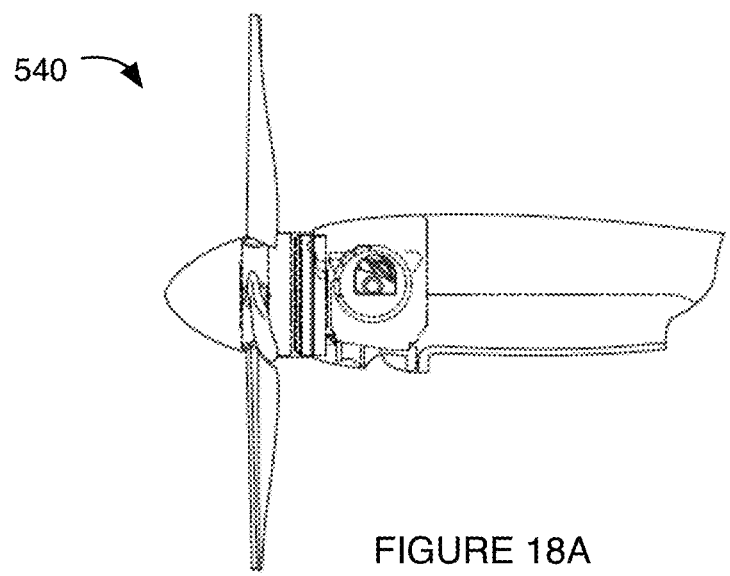
FIG. 18A depicts an example of the tilt mechanism in the forward configuration.
Figure 18B:
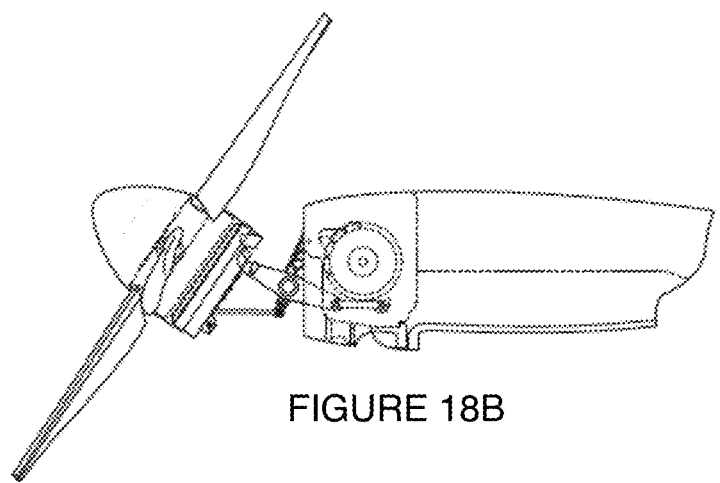
FIG. 18B depicts an example of the tilt mechanism transitioning between the forward and hover configurations.
Figure 18C:
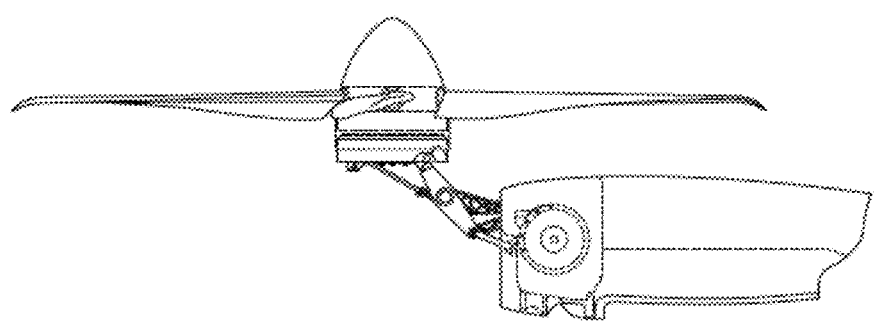
FIG. 18C depicts an example of the tilt mechanism in the hover configuration.

The optional tilt mechanism 540 functions to transition the orientation of each rotor between the hover configuration and the forward configuration as shown in the example in FIG. 18A-C. The tilt mechanism can also function to restrict the possible motion of the rotor disc 104 such that radial projection of the propeller disc toward the airframe 110 (e.g., the disc plane) in the hover and forward configurations does not intersect any portion the aircraft wherein a pilot is located. In the configuration wherein the disc plane is forward of the pilot region in the forward configuration, the disc plane preferably does not intersect the pilot region at each point during transition between the hover and forward configurations, inclusive of the endpoints (e.g., the hover configuration and forward configuration). Transitioning the orientation can include: pitching the propeller disc about an axis parallel to the pitch axis of the aircraft; translating a portion of the rotor assembly (e.g., relative to the attachment point on the aircraft); rotating the rotor disc about an axis parallel to the yaw axis of the aircraft; and any other suitable translation or rotation and/or combination of the aforementioned transition modalities.

The tilt mechanism associated with each rotor preferably adjusts each rotor between the hover configuration and the forward configuration (e.g., in conjunction with transition of the aircraft 100 between the hover mode and the forward mode); however, in additional or alternative variations, adjustment can be performed by a single tilt mechanism associated with all propellers (e.g., a tilting wing rigidly fixed to each rotor mounting point), by a number of tilt mechanisms different from the number of propellers of the plurality of propellers (e.g., wherein a set of six propellers are subdivided into pairs, and each pair is transitioned by a single tilt mechanism between the hover and forward configurations), and/or otherwise suitably performed. In a first variation, the aircraft 100 includes six propellers and six tilt mechanisms, wherein one tilt mechanism of the six tilt mechanisms is associated with one rotor of the six rotors (e.g., the rotors and tilt mechanisms have a one-to-one correspondence). In another variation, two or more rotors of the plurality of rotors are coupled to a single tilt mechanism such that actuation of the single tilt mechanism transitions the two or more rotors between the hover and forward configuration (e.g., wherein two or more rotors are rigidly coupled to a wing, and the tilt mechanism rotates the wing about the pitch axis to operate the aircraft between the hover configuration and the forward configuration).

In variations, the tilt mechanism can displace the entirety of an electric motor and the rotor away from the airframe (e.g., wing, pylon, etc.), relative to the remainder of the propulsion assembly 120. Displacement is preferably performed by a tilt mechanism including a linkage (e.g., as shown in FIGS. 18A-C); in such variations, the tilt mechanism of at least one rotor includes a linkage that displaces the electric motor and rotor parallel to the roll axis in the hover configuration (e.g., forward or rearward from the wing or pylon).

In additional or alternative variations, the tilt mechanism can rotate the rotor itself to transition between the forward and hover configurations. In an example of the aircraft in such a variation, the tilt mechanism of a left outboard rotor assembly, the right outboard rotor assembly, the left rear rotor assembly, and the right rear rotor assembly each include a pivot that rotates each propulsion assembly between the forward configuration and the hover configuration.

In a specific example, the tilt mechanism is the tilt mechanism described in U.S. application Ser. No. 16/409,653, filed May 10, 2019, which is incorporated in its entirety by this reference. However, any other suitable tilt mechanism can be used.

However, the aircraft can additionally or alternatively include any suitable number of rotors associated with any suitable number of tilt mechanisms in any suitable manner.

The lift coefficient for a cross section of the rotary airfoil non-dimensionally defines the lift (e.g., perpendicular force) performance of the rotary airfoil, at a range of angles of attack (e.g., the lift coefficient is defined as $C_L(\alpha)$), in relation to the fluid density of the surrounding fluid (e.g., air), the fluid velocity, and a reference area (e.g., a surface area of the airfoil, a cross sectional area of the airfoil, the square of a salient length scale such as a chord length or span length, etc.). In variations, $C_L(\alpha)$ is preferably shallow (e.g., has a minimal slope) within a desired angular range of operation (e.g., $8° \leq \alpha \leq 10°$) such that any variation in effective angle of attack due to inflow variation results in a minimal variation in lift force generated by the airfoil (e.g., as shown in FIG. 4). In an example, the rotary airfoil defines a lift coefficient that is approximately constant with angle of attack (e.g., has a slope of approximately zero) within a desired range of angles of attack (e.g., angular range of operation). However, the lift coefficient can have any other suitable slope at any desired ranges of angles of attack (e.g., the lift coefficient can define any other suitable shape).

The shallow slope of the lift coefficient in the desired angular region of the lift coefficient curve 201 can function to provide a psychoacoustic benefit during operation of a propeller utilizing two or more of the rotary airfoils defined by such a lift coefficient curve. For example, a shallow slope can attenuate higher harmonics of the acoustic output of such a propeller operated with its blades at an effective angle of attack within the desired range, which can provide a psychoacoustic advantage (e.g., without reducing the overall acoustic power output) and/or reduce the overall acoustic power output in potential exchange for a reduction in aerodynamic efficiency (e.g., which may result in a steeper variation of lift coefficient with increasing angle of attack). The acoustic benefit can be more pronounced at higher frequencies (where the output is also more psychoacoustically sensitive).

The variation of lift coefficient with angle of attack of the rotary airfoil also preferably exhibits shallow roll-off after the stall point in comparison with a different airfoil shape, as shown by example in FIG. 4. This can function to prevent large load discrepancies between blades from developing when all or part of one or more blades is in a localized stall condition. This can also function to prevent rapid loss of propulsive power (or lift force) when all or part of one or more rotary airfoils is in a localized stall condition.

The lift coefficient curve preferably defines a max CL point 210 (corresponding to maximum lift) at a critical angle of attack 245. Below the critical angle of attack, the lift coefficient curve preferably defines a semi-critical angle of attack, corresponding to the onset of flow separation at the semi-critical flow separation point 220 on the upper surface of the airfoil.

The lift coefficient curve can define one or more slopes. Slopes for the coefficient of lift curve can be determined as: the derivative of the coefficient of lift curve at a particular angle of attack (e.g., of a function approximating the curve), by the slope formula (change in lift coefficient over change in angle of attack), or otherwise calculated. The slope formula can be applied over any appropriate step size. The step can be for the angle of attack: a single degree change in angle of attack, a range across the angle of attack (e.g., first angle of attack range, second angle of attack range), a fraction of a range across the angle of attack (e.g., ¼ of the second angle of attack range), a fixed step size in the lift coefficient (e.g., for a 0.1 change in the lift coefficient), and/or otherwise calculated. The slope of the lift coefficient can further define a rate of change of the slope, using the same, similar, or different technique as the slope calculation. The rate of change of the slope of the lift coefficient curve can be determined as the second derivative, across part of a region as a change between two steps of the slope curve (which can be overlapping or non-overlapping), across an entire region of the lift coefficient curve, or otherwise calculated. The rate of change of the slope of the lift coefficient curve can be determined as a statistical deviation from a line or curve, evaluating the curvature of the lift coefficient curve (minimum curvature, maximum curvature, and/or average curvature), and/or otherwise determined.

Below the semi-critical angle of attack, the airfoil operates in a first angle of attack range 250 (e.g., forward range). The lift coefficient curve defines a linear (or near-linear) regime within first angle of attack range, corresponding to attached flow over the upper surface of the airfoil. The first angle of attack range has sufficient width such that variable inflow over the rotor disc area does not result in significant pressure drag or inefficiencies (as shown in the examples in FIGS. 13A-B). The first angle of attack range can have a width of: <1 deg, 1 deg, 2 deg, 3 deg, 4 deg, 5 deg, 7 deg, 10 deg, 1-4 deg, 4-6 deg, 6-10 deg, >10 deg, and/or any other appropriate width. The first angle of attack range can have a lift coefficient curve slope 255 of: <0.100 $\text{deg}^{-1}$, 0.100 $\text{deg}^{-1}$, 0.105 $\text{deg}^{-1}$, 0.110 $\text{deg}^{-1}$, 0.115 $\text{deg}^{-1}$, 0.120 $\text{deg}^{-1}$, 0.125 $\text{deg}^{-1}$, 0.130 $\text{deg}^{-1}$, 0.135 $\text{deg}^{-1}$, 0.140 $\text{deg}^{-1}$, >0.140 $\text{deg}^{-1}$, 0.100-0.110 $\text{deg}^{-1}$, 0.110-0.120 $\text{deg}^{-1}$, 0.115-0.125 $\text{deg}^{-1}$, 0.120-0.130 $\text{deg}^{-1}$, 0.110-0.130 $\text{deg}^{-1}$, >0.130 $\text{deg}^{-1}$, and/or any other appropriate slope. Preferably, the lift coefficient curve is approximately linear across the first angle of attack range, but can additionally or alternately be concave up (increasing rate of change of the slope), concave down (negative rate of change of the slope), and/or have any appropriate characteristics. The first angle of attack range can be defined by a minimum angle of attack and maximum angle of attack. The minimum angle of attack for the first angle of attack range can be: −10 deg, −7 deg, −5 deg, −3 deg, −1 deg, 0 deg, 1 deg, 2 deg, 3 deg, 4 deg, 5 deg, 6 deg, 7 deg, 8 deg, 9 deg, 10 deg, <1 deg, <0 deg, and/or any other appropriate minimum angle of attack. The maximum angle of attack for the first angle of attack range can be: 1 deg, 2 deg, 3 deg, 4 deg, 5 deg, 6 deg, 7 deg, 8 deg, 9 deg, 10 deg, 11 deg, 12 deg, 13 deg, 15 deg, and/or any other appropriate maximum angle of attack.

Above the semi-critical angle of attack and below the critical angle of attack, the airfoil operates in a second angle of attack range 260 (e.g., hover range). The second angle of attack range preferably has a shallower slope of the lift coefficient curve than the first angle of attack range, and corresponds to separated flow over the upper surface of the airfoil between the semi-critical separation point and the trailing edge, but can alternatively have a steeper or the same slope as the first angle of attack range. The second angle of attack range can have a smaller, larger, or the same width as the first angle of attack range. The second angle of attack range is preferably separate and distinct from the first angle of attack range, but can additionally or alternatively overlap with the first angle of attack range. The second angle of attack range can abut (e.g., be adjacent to) the first angle of attack range, or be separated by a third angle of attack range. However, the second angle of attack range can be otherwise related to the first angle of attack range.

Figure 9:
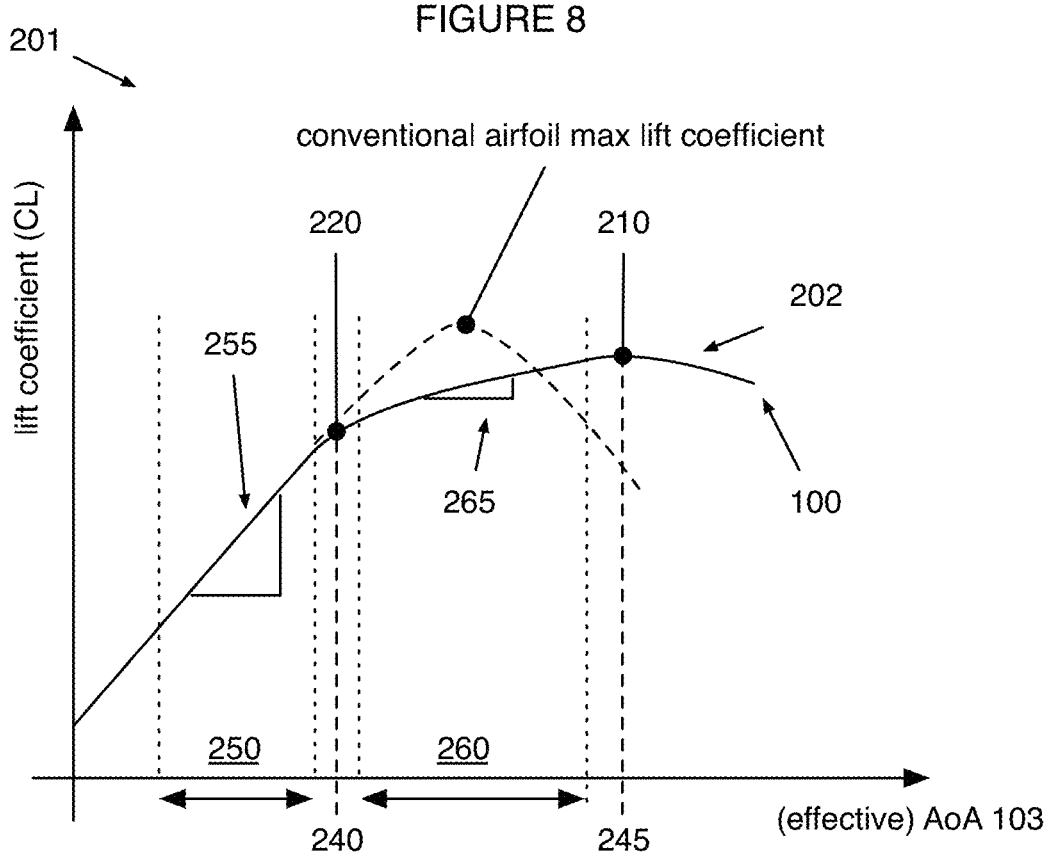
FIG. 9 depicts an example curves of lift coefficient variation with angle of attack, and a comparison of an example of the rotary airfoil with an example conventional airfoil.

The second angle of attack range can have any appropriate characteristics on the lift coefficient curve. Preferably, the second AoA range is sufficiently wide such that inflow variations still have effective angles of attack which fall in this regime. Since the slope of this curve is shallower, the acoustic impact of resulting from these inflow variations is reduced. The second angle of attack range can have a width of: <1 deg, 1 deg, 2 deg, 3 deg, 4 deg, 5 deg, 7 deg, 10 deg, 1-4 deg, 4-6 deg, 6-10 deg, >10 deg, and/or any other appropriate width. The second angle of attack range can have a lift coefficient curve slope 265 defined relative to a slope of the lift coefficient curve over the first angle of attack range ($m_1$) or defined independently of $m_1$. The second angle of attack can have a slope of: 0.99 $m_1$, 0.99 $m_1$, 0.98 $m_1$, 0.95 $m_1$, 0.90 $m_1$, 0.85 $m_1$, 0.80 $m_1$, 0.75 $m_1$, 0.50 $m_1$, 0.25 $m_1$, 0.15 $m_1$, 0.10 $m_1$, 0.95 $m_1$-0.99 $m_1$, 0.90 m-0.99 $m_1$, 0.80 $m_1$-0.99 $m_1$, 0.80 $m_1$-0.90 $m_1$, 0.50 $m_1$-0.99 $m_1$, 25 $m_1$-0.99 $m_1$, 0.25 $m_1$-0.75 $m_1$, 0.25 $m_1$-0.50 $m_1$, 0.10 $m_1$-0.90 $m_1$, >0 $\text{deg}^{-1}$, 0.020 $\text{deg}^{-1}$, 0.040 $\text{deg}^{-1}$, 0.060 $\text{deg}^{-1}$, 0.080 $\text{deg}^{-1}$, 0.100 $\text{deg}^{-1}$, 0.120 $\text{deg}^{-1}$, 0.130 $\text{deg}^{-1}$, 0.100-0.110 $\text{deg}^{-1}$, 0.110-0.120 $\text{deg}^{-1}$, 0.120-0.130 $\text{deg}^{-1}$, 0.110-0.130 $\text{deg}^{-1}$, >0.130 $\text{deg}^{-1}$, and/or any other appropriate slope. Preferably, the lift coefficient curve is approximately linear across the second angle of attack range (as shown in the example in FIG. 9), but can additionally or alternately be concave up (increasing rate of change of the slope), concave down (negative rate of change of the slope), and/or have any appropriate characteristics. The rate of change of the slope of the lift coefficient curve for the second angle of attack range can be <0 $\text{deg}^{-1}$ and: >−0.0001 $\text{deg}^{-2}$, >−0.0003 $\text{deg}^{-2}$, >−0.0005 $\text{deg}^{-2}$, >−0.0007 $\text{deg}^{-2}$, >−0.001 $\text{deg}^{-2}$, >−0.0015 $\text{deg}^{-2}$, >−0.002 $\text{deg}^{-2}$, >−0.003 $\text{deg}^{-2}$, >−0.004 $\text{deg}^{-2}$, >−0.005 $\text{deg}^{-2}$, >−0.007 $\text{deg}^{-2}$, >−0.01 $\text{deg}^{-2}$, and/or any appropriate rate of change of the lift coefficient curve.

Between the first angle of attack range and the second angle of attack range, there can be a third angle of attack range (e.g., flow transition region), which contains the semi-critical angle of attack. Preferably, the third angle of attack range corresponds to a sharp increase in the drag coefficient versus lift coefficient curve 410 (example shown in FIG. 13B), but can correspond to any appropriate shape of the drag coefficient versus lift coefficient curve. The third angle of attack range can have any appropriate width, the width can be: <1 deg, 0.5 deg, 1 deg, 1.5 deg, 2 deg, 2.5 deg, 3 deg, 1-3 deg, >3 deg, and/or any other appropriate width. The third angle of attack range can have any appropriate lift coefficient curve slope. The slope can be positive and/or negative across this region, and can be defined relative to a slope of the lift coefficient curve over the first angle of attack range (where $M=m_1$), defined relative to a slope of the lift coefficient curve over the second angle of attack range (where $M=m_2$), and/or defined independently of $m_1$ and/or $m_2$; it can have be: M, 0.95M, 0.9M, 0.7M, 0.5M, 0.3M, 0.2M, 0.1M, 0.05M, 0, −0.05M, −0.1M, −0.3M, −0.5M, −0.7M, −0.9M, −M, between −0.5M and 0.5M, between 0 and 0.5M, between 0 and 0.9M, 0 $\text{deg}^{-1}$, 0.020 $\text{deg}^{-1}$, 0.040 deg$^{-1}$, 0.060 deg$^{-1}$, 0.080 deg$^{-1}$, 0.100 deg$^{-1}$, >0.100 deg$^{-1}$, 0-0.100 deg$^{-1}$, <0 deg$^{-1}$, and/or any other appropriate slope. Preferably, the lift coefficient curve is approximately linear across the third angle of attack range, but can additionally or alternately be concave up (increasing rate of change of the slope), concave down (negative rate of change of the slope), have an inflection point in the lift coefficient curve, and/or have any appropriate characteristics. The rate of change of the slope of the lift coefficient curve for the third angle of attack range can be any appropriate value.

In a first example the airfoil blade comprises a first airfoil cross section, the first airfoil cross section defining: a chord line defining a chord length L; a leading edge, comprising a leading edge radius between 0.002 L and 0.05 L; a trailing edge, comprising a trailing edge thickness between zero and 0.03 L; a maximum thickness between 0.07 L and 0.2 L and located between 0.2 L and 0.6 L along the chord line; and a maximum camber between 0 and 0.2 L and located between 0.2 L and 0.7 L along the chord line.

In a specific variant of the first example, the leading edge radius is approximately 0.006 L; the trailing edge thickness is approximately 0.005 L; the maximum thickness is approximately 0.12 L at the position of approximately 0.4 L along the chord line; and the maximum camber is approximately 0.024 L at the position of approximately 0.44 L along the chord line.

Figure 13A:
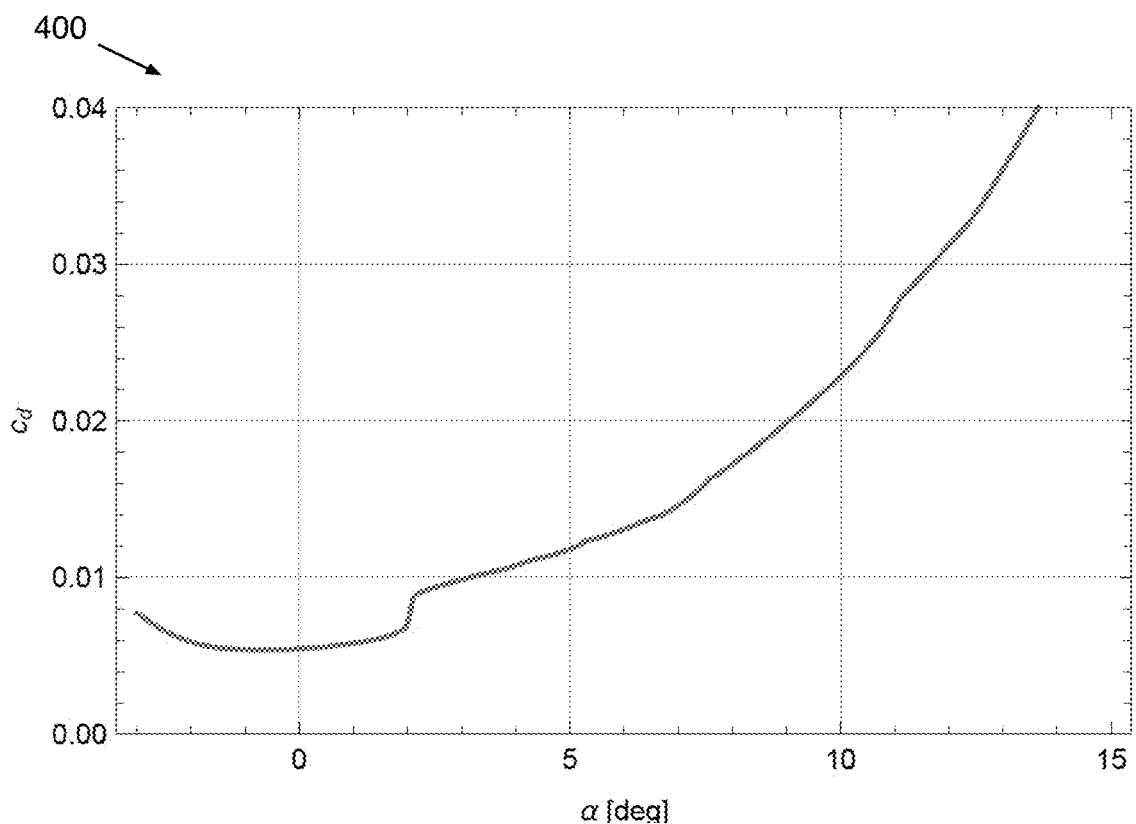
FIG. 13A depicts an example of a drag coefficient curve of the rotary airfoil at different angles of attack.
Figure 13B:
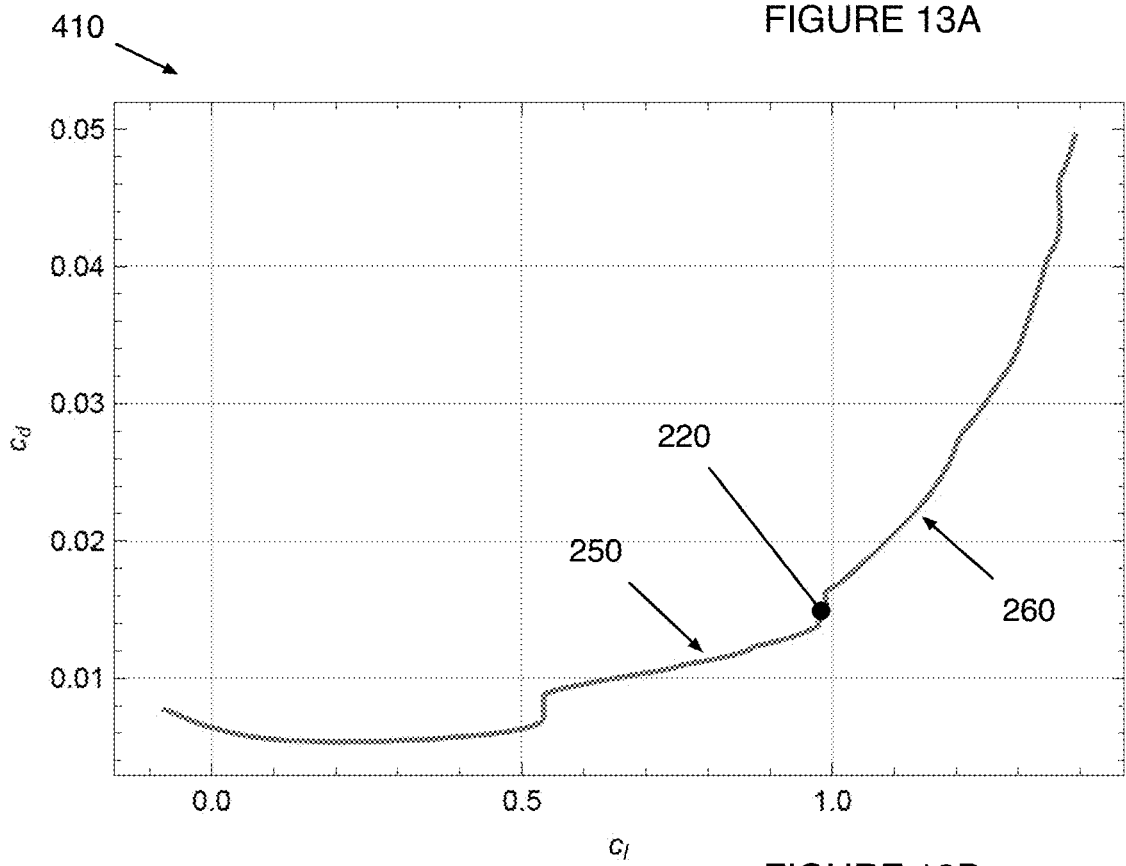
FIG. 13B depicts an example of a drag coefficient versus lift coefficient curve of the rotary airfoil.

The airfoil cross section can further define a drag coefficient vs AoA curve 400, an example of which is shown in FIG. 13A.

However, the system can include any other additional components.

4. Method

As shown in FIG. 2, the design method 200 can include: parameterizing the airfoil geometry and generating an airfoil shape based on the parameterization S100; determining the performance parameters of the airfoil shape S200; and optimizing the parameters of the airfoil geometry to achieve a performance threshold S300.

Block S100 includes parameterizing the airfoil geometry and generating an airfoil shape based on the parameterization. Block S100 functions to determine numerical parameters that collectively define a functional description of the shape of the airfoil geometry (e.g., the shape of the airfoil cross section), and generating such a shape using the numerical parameters. Block S100 can also function to provide an input to subsequent Blocks of the method 200 (e.g., Block S200), as a starting condition for an iterative optimization of the geometry.

However, in alternative variations, Block S100 can include otherwise suitably parameterizing the airfoil geometry.

Block S200 includes determining the performance parameters of the airfoil shape. Block S200 functions to analyze the aerodynamic performance of the airfoil shape defined parametrically (e.g., in accordance with one or more variations of Block S100). Block S200 can include determining the lift coefficient, drag coefficient, and/or moment coefficient of the rotary airfoil; Block S200 can additionally or alternatively include determining any other suitable performance parameters (e.g., aerodynamic performance parameters, structural performance parameters, etc.). The outputs of Block S200 preferably include the performance parameter values at a range of inflow conditions (e.g., angles of attack, inflow velocity, fluid densities and temperatures, etc.); however, Block S200 can additionally or alternatively generate any other suitable outputs. The ranges for which the values are determined preferably include the range of inflow conditions expected for nominal and extreme operation of a propulsion system implementing the rotary airfoil; however, Block S200 can additionally or alternatively determine values of performance parameters across any suitable range of inflow conditions.

In variations, Block S200 can be performed numerically. For example, Block S200 can include numerically defining an airfoil geometry using the parameterization output of Block S100, and simulating the response of the airfoil geometry to various flow conditions using a computational fluid dynamics (CFD) airfoil-analysis program (e.g., Xfoil). In such variations, the outputs of Block S200 include numerically-derived estimates of the performance parameters (e.g., lift coefficient, drag coefficient, etc.).

In further variations, Block S200 can be performed using physical models. For example, Block S200 can include manufacturing a three-dimensional blade embodying the determined airfoil shape, and testing the three-dimensional blade at a range of inflow conditions in a physical airfoil assessment facility (e.g., wind tunnel). In such variations, the outputs of Block S200 include the directly measured performance parameters. In such variations, the three-dimensional blade can be manufactured using various methodologies (e.g., additive manufacturing, 3D printing, conventional machine tool operations, foam cutting, etc.) out of any suitable materials (e.g., non-structural materials suitable for aerodynamic modeling, structural materials, etc.).

Block S200 can additionally or alternatively be performed using a combination of numerical analysis and physical modeling. However, Block S200 can be otherwise suitably performed.

Block S300 includes optimizing the parameters of the airfoil geometry to achieve a performance threshold. Block S300 functions to iterate the airfoil geometry towards achieving the desired performance parameter values.

Block S300 can include prescribing a weight function in terms of the performance parameters, which are in turn related to the airfoil geometry by way of the analysis thereof to obtain the performance parameters (e.g., in Block S200). For example, the weight function can be defined as a function $f(C_L)$. The weight function can additionally or alternatively be defined to include the slope of the lift coefficient with angle of attack, or otherwise suitably defined. However, Block S300 can additionally or alternatively include defining any other suitable weight function.

Block S300 can include minimizing the prescribed weight function, in order to determine the optimal parameters. Such minimization preferably includes minimizing an expression of the form $\int C_D \cdot f(C_L) dC_L$. Block S300 can, in variations, include minimizing an integral of the form $$\int \frac{dC_L}{d\alpha} \cdot f(C_L) dC_L,$$

to account for minimizing the slope of the lift coefficient with angle of attack. However, the weight function can be otherwise suitably minimized. Minimizing can be performed using any suitable minimization or optimization algorithm.

Block S300 can, in variations, include performing iterative weight function prescription and/or minimization, while varying the values of the geometric parameters determined as an output of airfoil parameterization (e.g., Block S100). In such variations, the airfoil shape parameters can act as the independent variables of the optimization, and the output variables (e.g., dependent variables) are the performance parameters.

Block S300 is preferably performed iteratively until the output performance parameters converge to values below a performance threshold. In variations, the performance threshold includes a slope of the $C_L(\alpha)$ curve, and in particular includes the slope of the curve in the operating range of angles of attack (e.g., between 7 and 11 degrees). In such variations, the threshold slope can have any suitable value (e.g., a zero slope, a minimal slope, a slope less than that generated by a flat plate airfoil, etc.). In additional or alternative variations, the performance threshold includes a roll-off slope of the $C_L(\alpha)$ curve at angles greater than the stall angle. However, Block S300 can additionally or alternatively include performing Block S300 over a single iteration and/or without convergence to less than or equal to a performance threshold value.

Although omitted for conciseness, the preferred embodiments include every combination and permutation of the various system components, which can be combined in any suitable permutation or combination and/or omitted in whole or in part from variations of the preferred embodiments.

As a person skilled in the art will recognize from the previous detailed description and from the figures and claims, modifications and changes can be made to the preferred embodiments of the invention without departing from the scope of this invention defined in the following claims.

What is claimed is:

1. A rotor for a tilt-rotor aircraft, the rotor defining a disc plane, the rotor comprising:
    a plurality of airfoil blades, each of the plurality of airfoil blades comprising:
        a first angle of attack (AoA) range, said first AoA range having a minimum angle of −5 deg, said first AoA range having a maximum angle of 5 deg;
        a second AoA range, said second AoA range from 8 deg to 10 deg; and
        a raised feature on an upper side of said airfoil blade, said raised feature comprising a convex portion of the upper side, a concave portion of the upper side trailing the convex portion, thereby defining a flow separation point, wherein the mean camber line of a trailing edge of said airfoil blade slopes downward;
    a rotor tilt mechanism, the rotor tilt mechanism configured to transform the rotor between:
        a forward configuration, wherein each of the plurality of airfoil blades operates in the first AoA range and the disc plane is parallel to a pitch-yaw plane of the tilt-rotor aircraft; and
        a hover configuration, wherein each of the plurality airfoil blades operates in the second AoA range and the disc plane intersects the pitch-yaw plane.

2. The rotor of claim 1, further comprising a blade pitching mechanism, wherein in the forward configuration the blade pitching mechanism orients each of the plurality of airfoil blades at a forward AoA within the first AoA range, wherein in the hover configuration the blade pitching mechanism orients each of the plurality of airfoil blades at a hover AoA within the second AoA range.

3. The rotor of claim 1, wherein the rotary airfoil blades comprise:
    a chord length having a chord length (L);
    a maximum thickness between 0.08 L and 0.16 L located between 0.35 L and 0.45 L along the chord line;
    a maximum camber between 0 L and 0.2 L located between 0.2 L and 0.7 L along the chord line;
    a leading edge having a radius between 0,002 L and 0.05 L; and
    a trailing edge.

4. The rotor of claim 1 wherein the slope of the lift coefficient curve of said blades in the second AoA range is smaller than the slope of the lift coefficient curve of said blades in the first AoA range.

5. The rotor of claim 2 wherein the slope of the lift coefficient curve of said blades in the second AoA range is smaller than the slope of the lift coefficient curve of said blades in the first AoA range.

6. The rotor of claim 3 wherein the slope of the lift coefficient curve of said blades in the second AoA range is smaller than the slope of the lift coefficient curve of said blades in the first AoA range.

* * * * *